US012155109B2

(12) United States Patent
Lee et al.

(10) Patent No.: US 12,155,109 B2
(45) Date of Patent: Nov. 26, 2024

(54) WAVEGUIDE

(71) Applicant: AMOSENSE CO., LTD., Cheonan-si (KR)

(72) Inventors: Seho Lee, Seoul (KR); Hyungil Baek, Yongin-si (KR); Hyunjoo Park, Seoul (KR); Hanju Do, Pyeongtaek-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 377 days.

(21) Appl. No.: 17/769,227

(22) PCT Filed: Oct. 8, 2020

(86) PCT No.: PCT/KR2020/013723
§ 371 (c)(1),
(2) Date: Apr. 14, 2022

(87) PCT Pub. No.: WO2021/075790
PCT Pub. Date: Apr. 22, 2021

(65) Prior Publication Data

US 2023/0352806 A1 Nov. 2, 2023

(30) Foreign Application Priority Data

Oct. 15, 2019 (KR) ........................ 10-2019-0128089
Nov. 21, 2019 (KR) ........................ 10-2019-0150676

(51) Int. Cl.
*H01P 3/12* (2006.01)
*H01P 1/04* (2006.01)

(52) U.S. Cl.
CPC ................ *H01P 3/12* (2013.01); *H01P 1/042* (2013.01)

(58) Field of Classification Search
CPC ........... H01P 1/042; H01P 11/002; H01P 3/12
See application file for complete search history.

(56) References Cited

U.S. PATENT DOCUMENTS

2005/0162235 A1 7/2005 An et al.
2006/0214751 A1 * 9/2006 Leadley-Brown .... H01P 11/002 333/254

(Continued)

FOREIGN PATENT DOCUMENTS

KR 10-2004-0069658 A 8/2004
KR 10-1914551 B1 11/2018

(Continued)

OTHER PUBLICATIONS

KR Office Action dated Sep. 8, 2021 as received in Application No. 10-2019-0128089.

(Continued)

*Primary Examiner* — Quan Tra
(74) *Attorney, Agent, or Firm* — Maschoff Brennan

(57) ABSTRACT

The present invention relates to a waveguide comprising: a first body and a second body which are injected-molded, have metal-coated surfaces, and are connected in the up-down or left-right direction so as to form a transmission space in which radio waves can move in the longitudinal direction; and a first coupling surface and a second coupling surface which come into surface contact with each other when the first body and the second body are coupled, wherein the coupling surfaces are coupled through a coupling body, or by forming a bending structure in which protrusions and grooves formed on the coupling surfaces are engaged with each other.

13 Claims, 15 Drawing Sheets

100

(56) References Cited

U.S. PATENT DOCUMENTS

| | | | | |
|---|---|---|---|---|
| 2010/0039186 | A1* | 2/2010 | Ko | H01P 11/007 333/135 |
| 2010/0085246 | A1 | 4/2010 | Shen | |
| 2010/0109820 | A1* | 5/2010 | Ko | H01P 1/30 333/248 |
| 2017/0062895 | A1* | 3/2017 | Zhu | H01P 11/002 |

FOREIGN PATENT DOCUMENTS

| | | | | |
|---|---|---|---|---|
| KR | 10-2019-0060394 | A | 6/2019 | |
| WO | WO-2017208153 | A1 * | 12/2017 | H01P 11/002 |

OTHER PUBLICATIONS

KR Office Action dated Sep. 8, 2021 as received in Application No. 10-2019-0150676.

KR Decision to Grant Dated Mar. 18, 2022 as received in Application No. 10-2019-0150676.

KR Decision to Grant Dated Mar. 23, 2022 as received in Application No. 10-2019-0128089.

* cited by examiner

[FIG. 1]
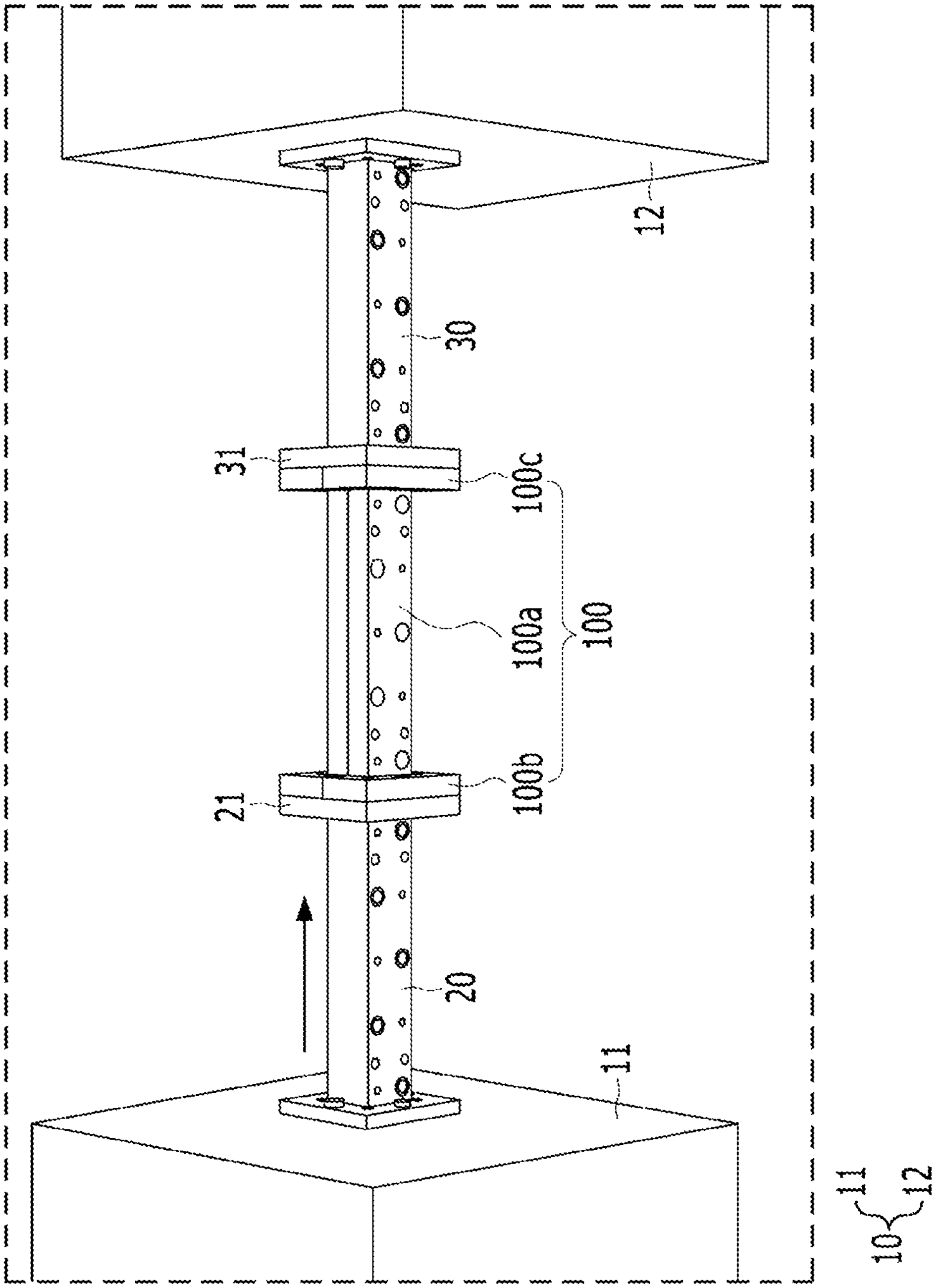

[FIG. 2]
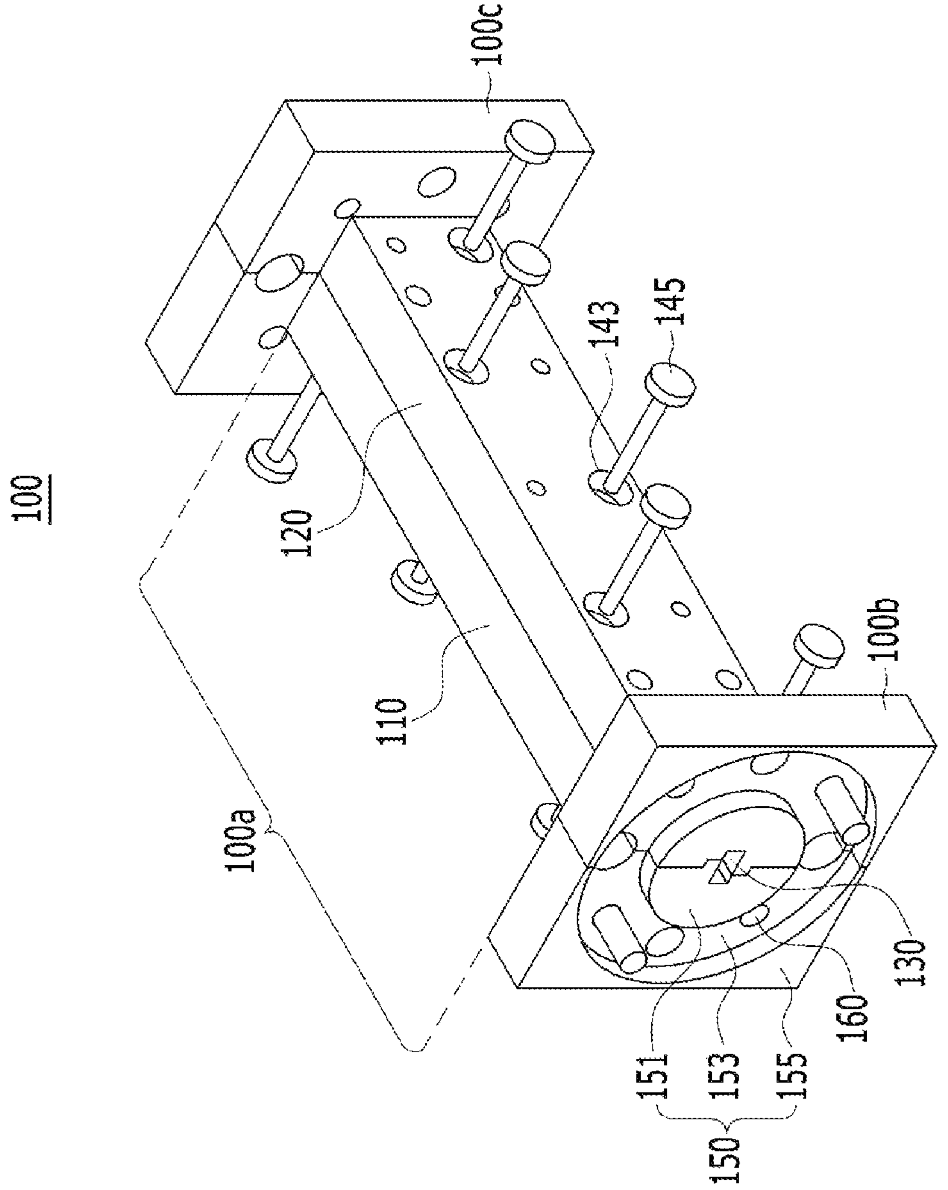

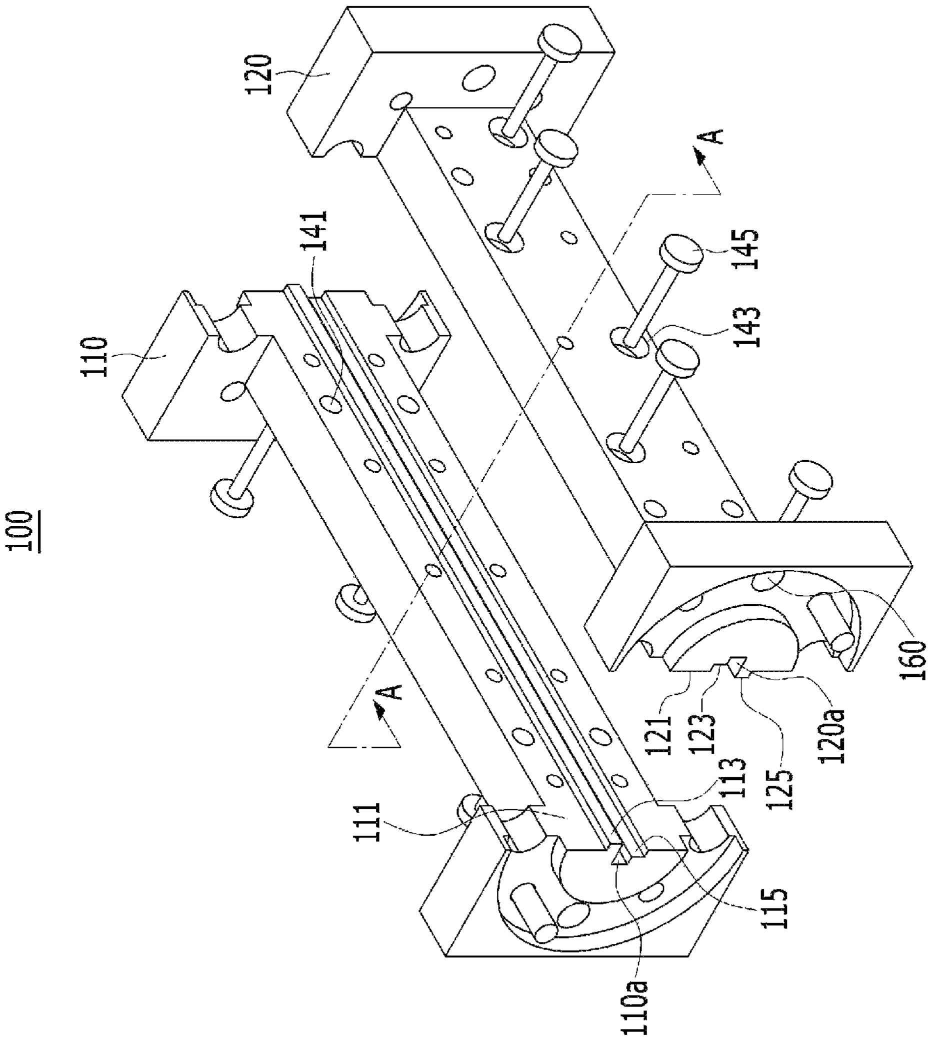
[FIG. 3]

[FIG. 4]
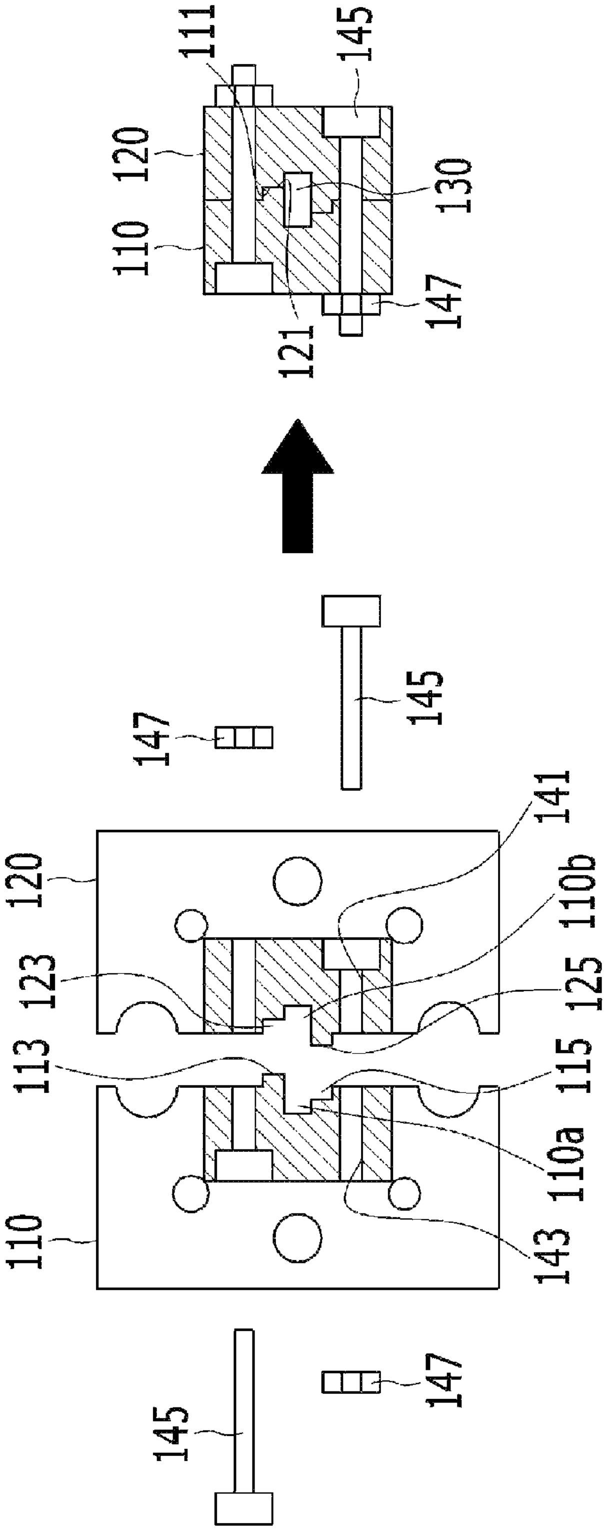

[FIG. 5]
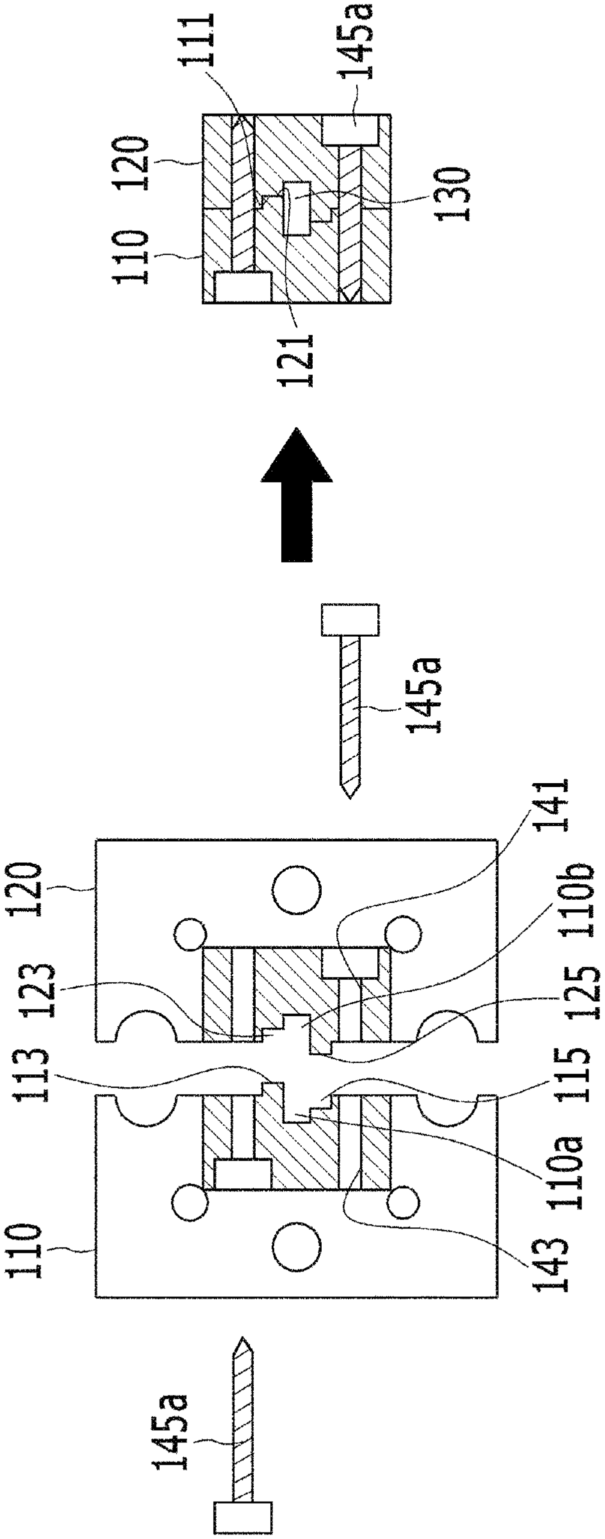

[FIG. 6A]
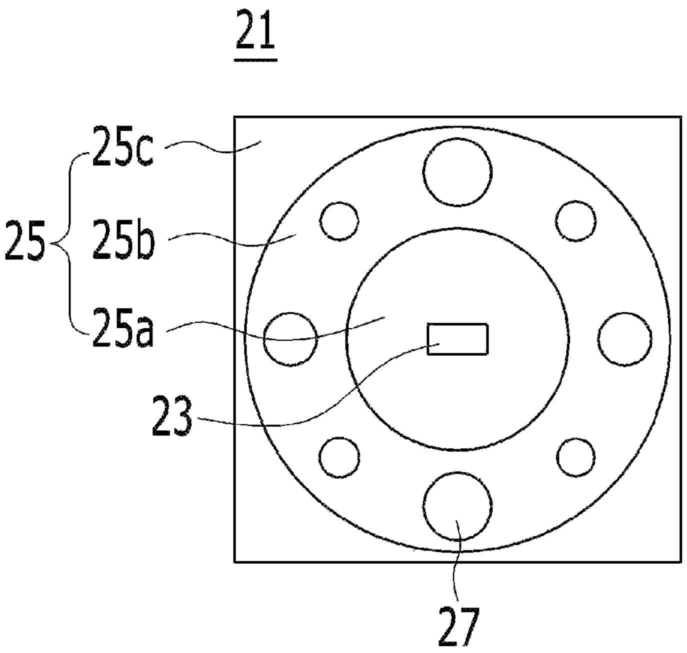
[FIG. 6B]
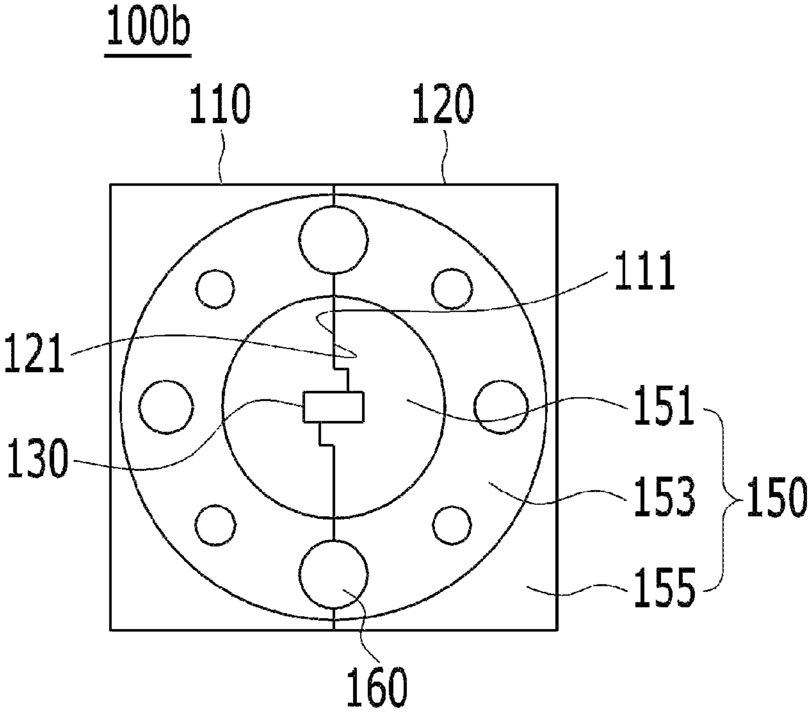

[FIG. 7A]
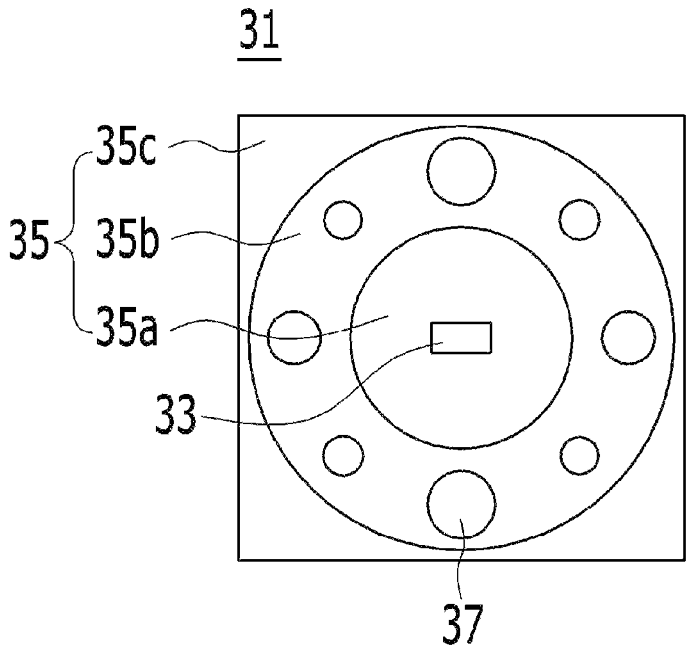
[FIG. 7B]
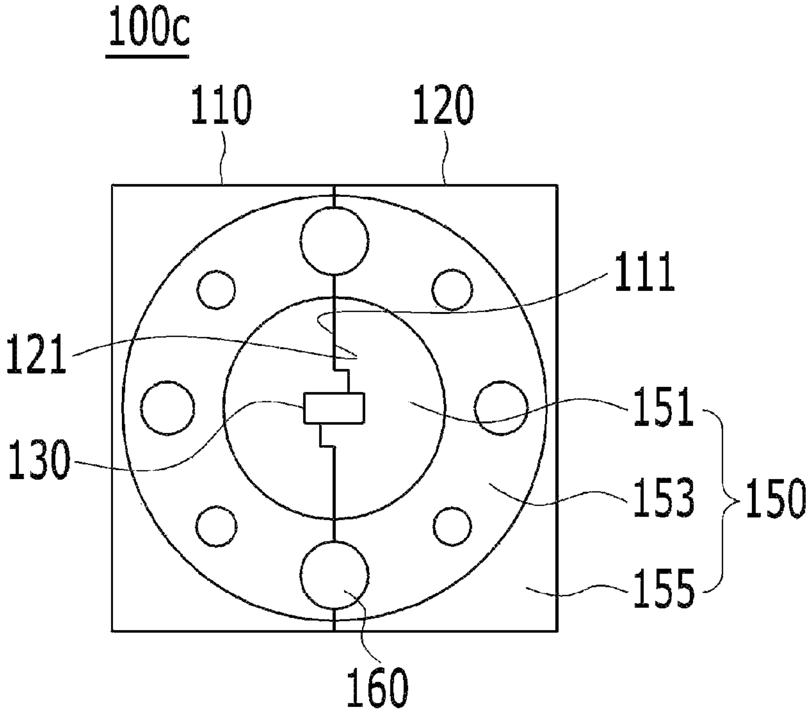

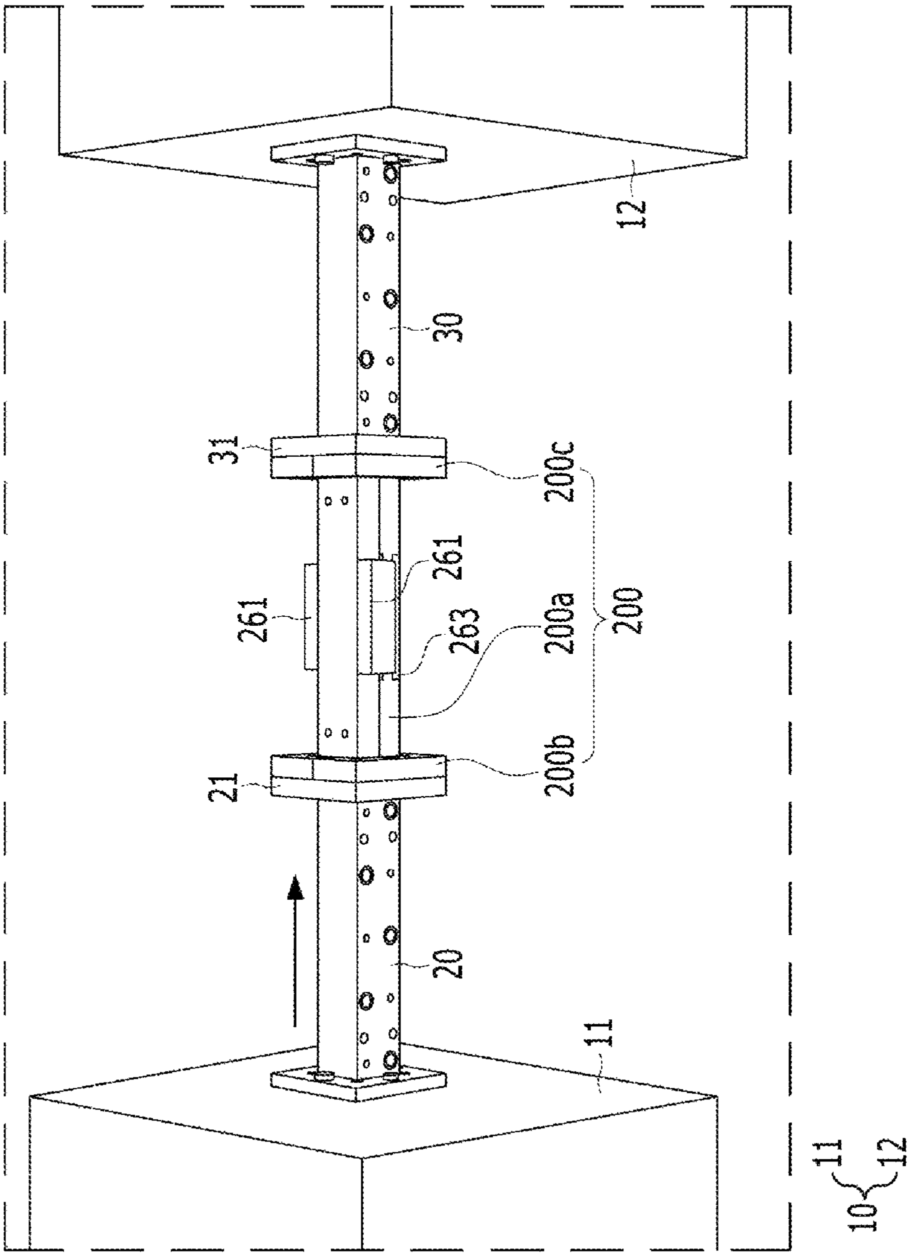
[FIG. 8]

[FIG. 9]
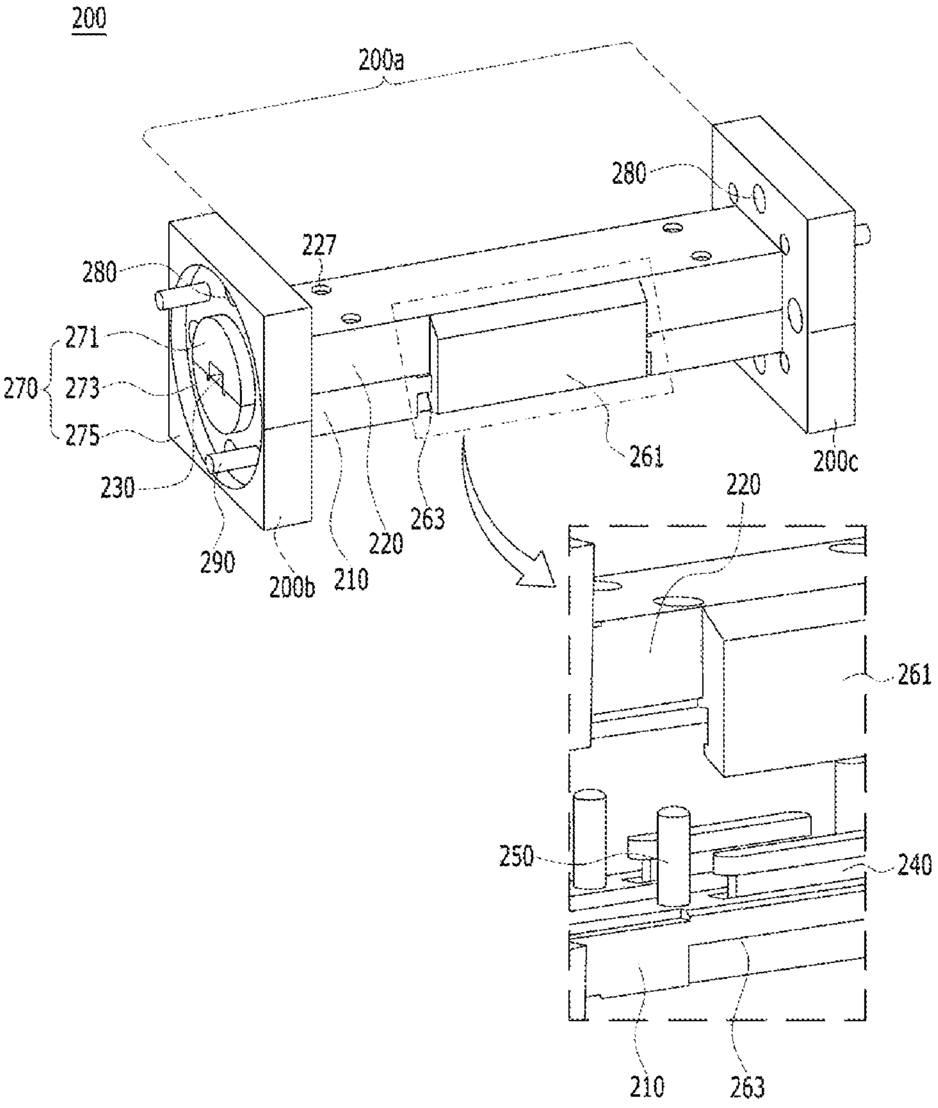

[FIG. 10]
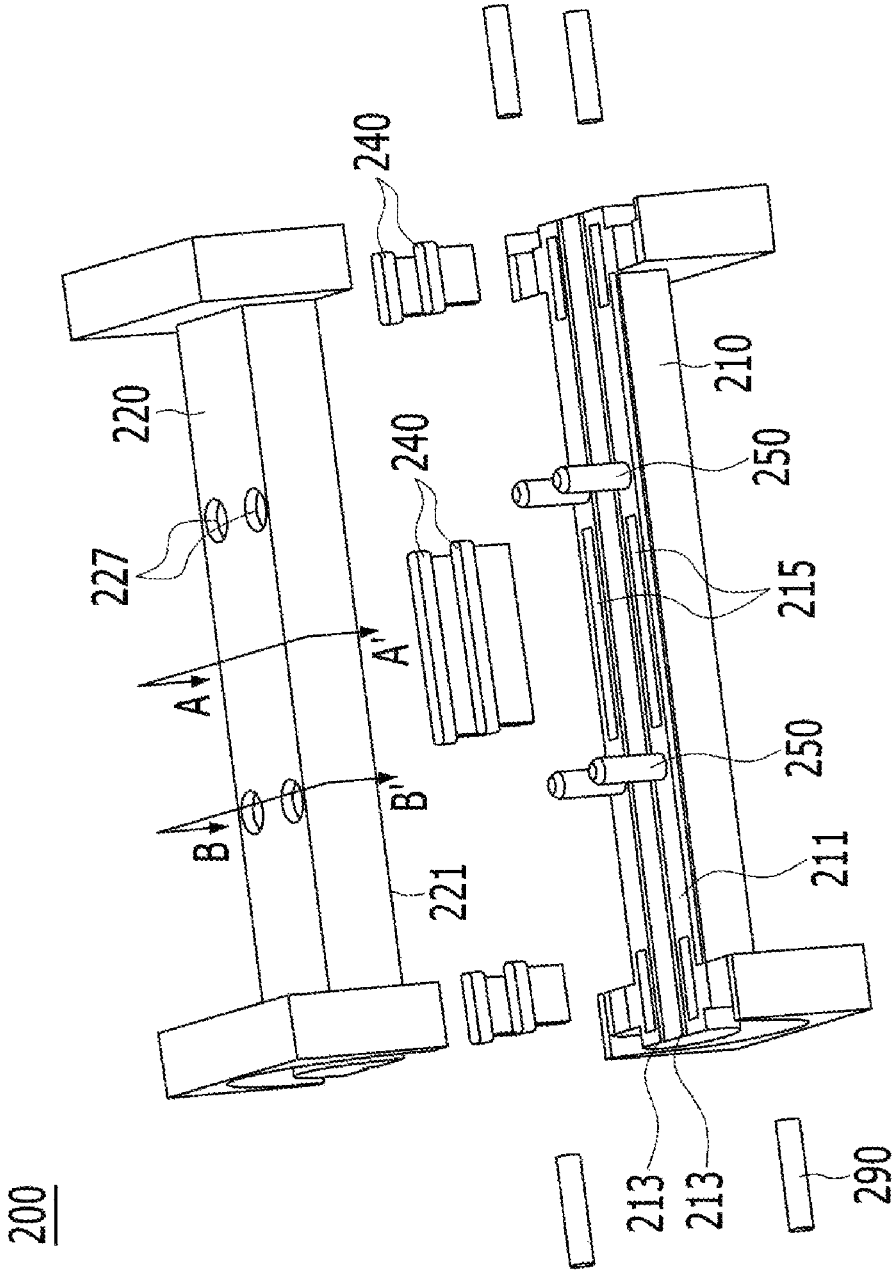

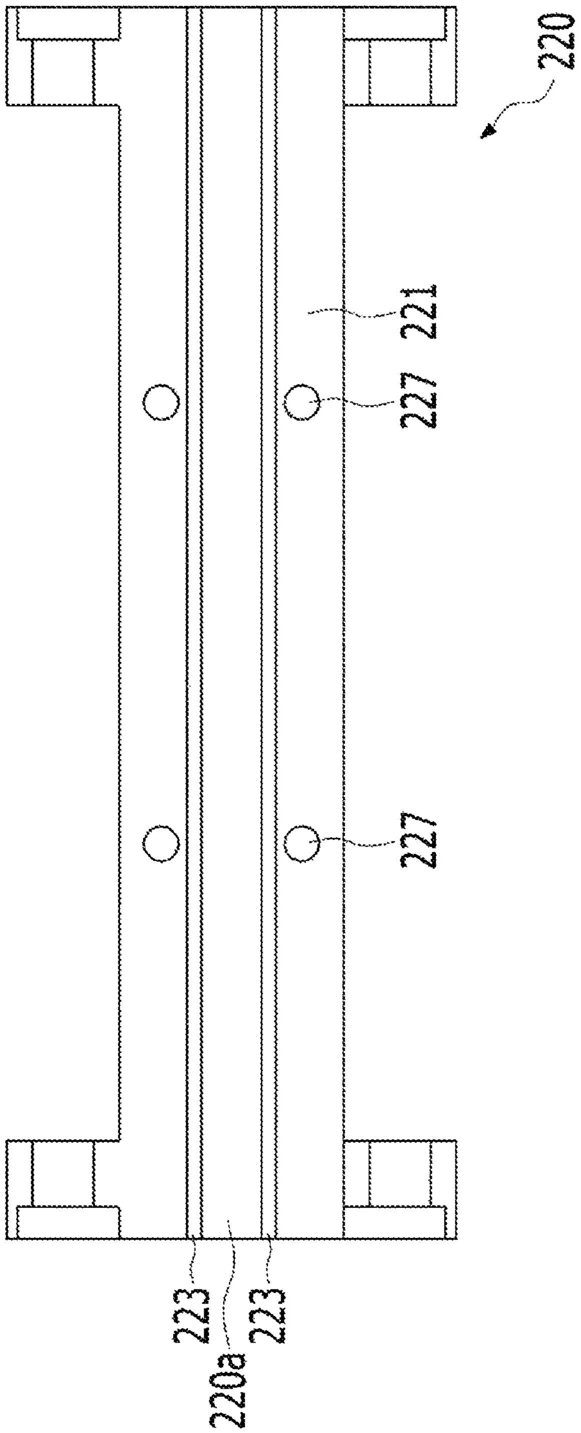
[FIG. 11]

[FIG. 12]
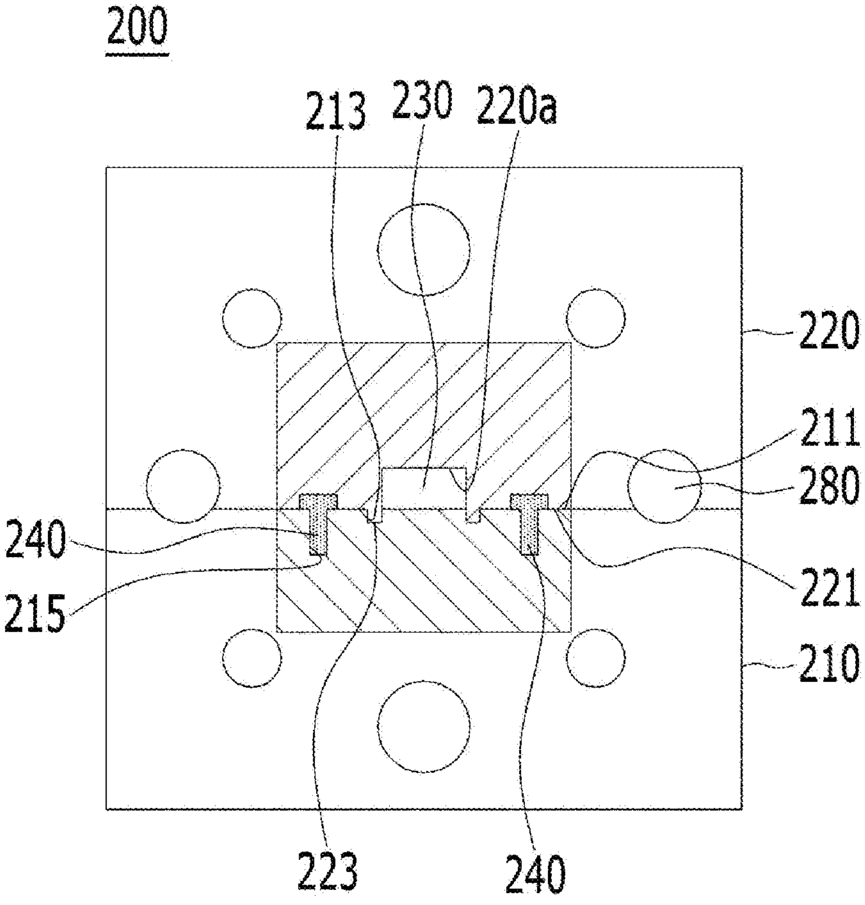

[FIG. 13]
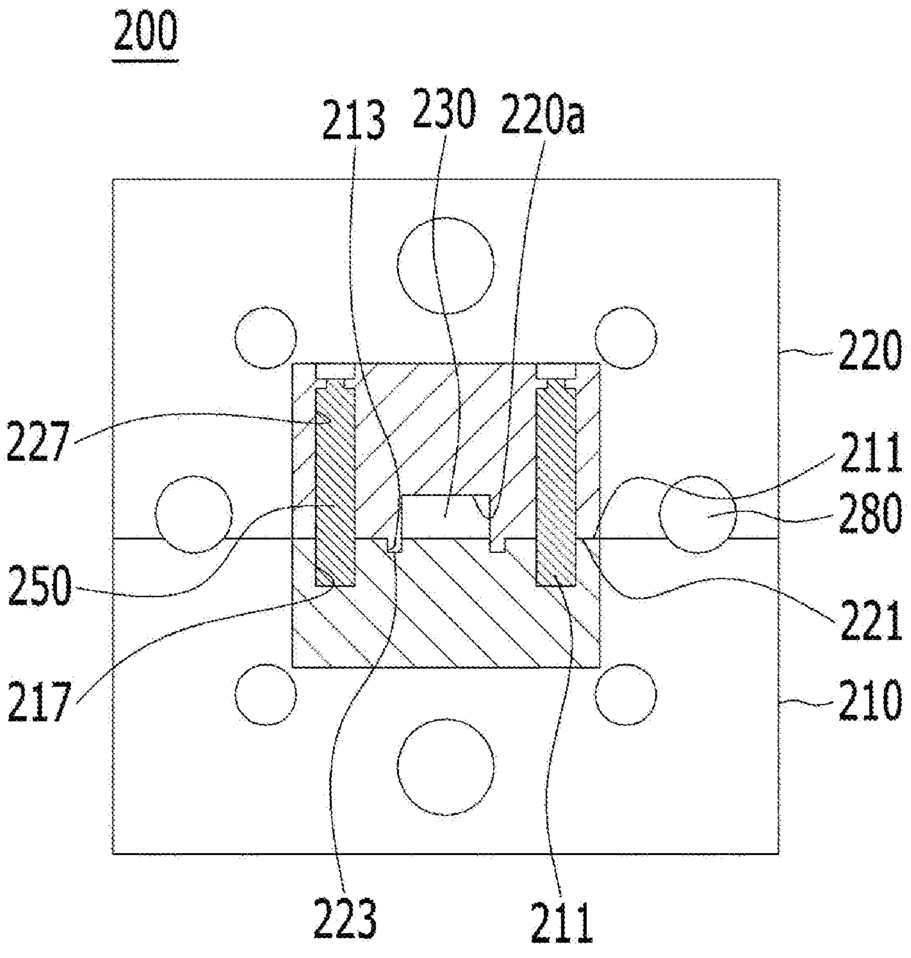

[FIG.14A]
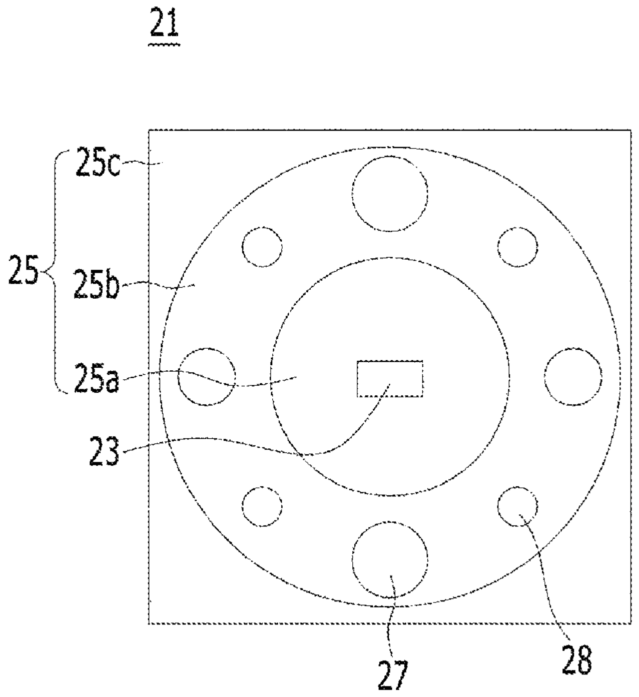
[FIG. 14B]
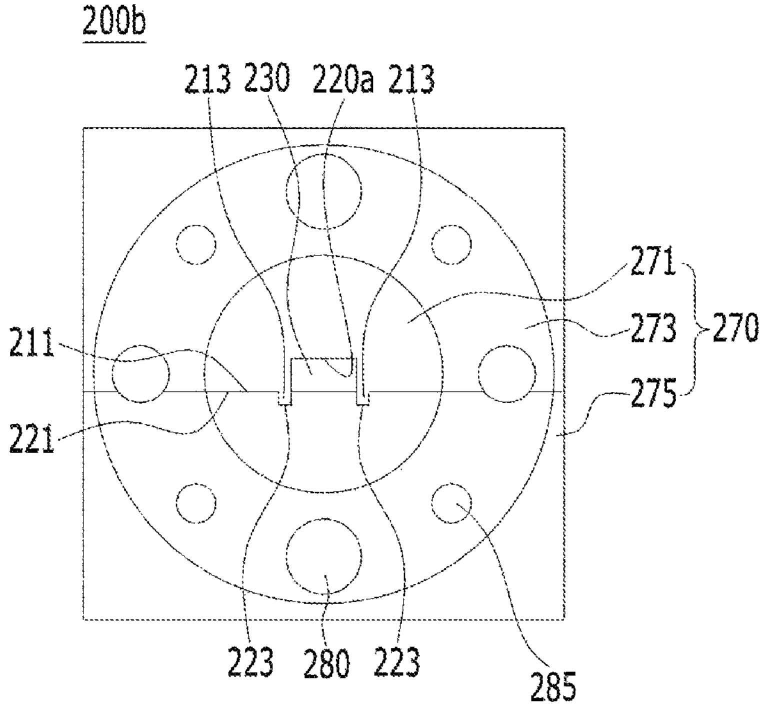

[FIG. 15A]
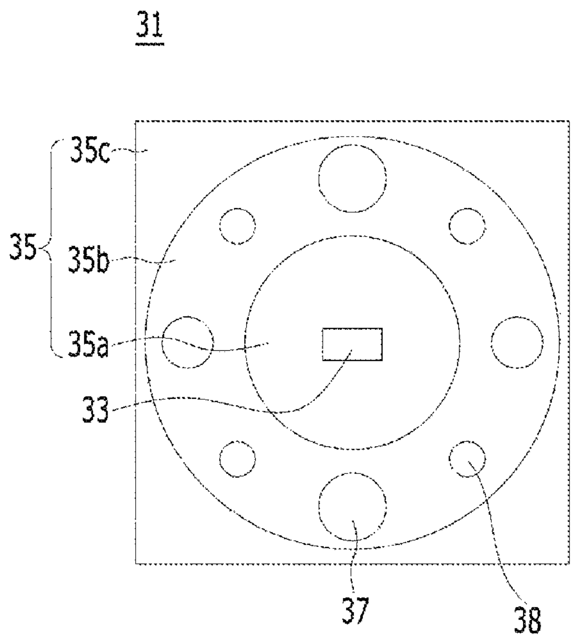
[FIG. 15B]
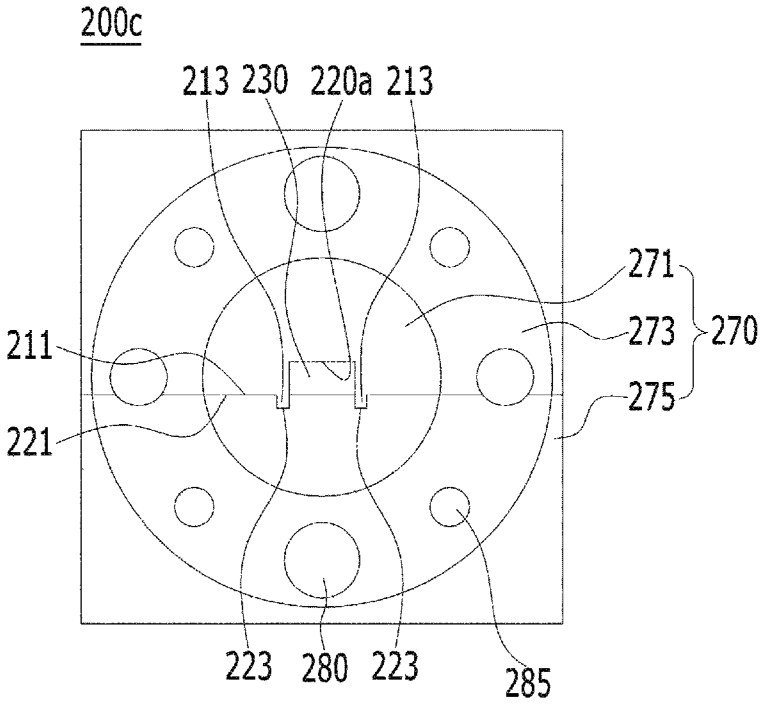

WAVEGUIDE

TECHNICAL FIELD

The present disclosure relates to a waveguide used in a radar antenna for a vehicle, and more specifically, to a waveguide connected to a test measuring instrument to measure radio wave transmission characteristics.

BACKGROUND ART

Recently, research on a transmission/reception system using a high frequency of a military wave band (77 GHz band) is being actively conducted. In the military wave, an antenna having a waveguide structure is mainly used as an antenna for transmitting and receiving radio waves.

Such an antenna having the waveguide structure has problems such as an increase in weight due to the use of metal, difficulty in assembling due to stacking a plurality of plates to form a waveguide, and eccentricity occurring while assembling. Therefore, studies have been recently conducted to form a waveguide by injecting, metal-coating, and then bonding two bodies of an upper plate and a lower plate in order to reduce the weight and facilitate assembling.

In addition, when the waveguide is formed by injecting and bonding the two bodies, it is important not to leak the radio wave through the coupling surface, so that the manufactured waveguide is connected to a test measuring instrument to measure radio wave transmission characteristics.

DISCLOSURE

Technical Problem

An object of the present disclosure is to provide a waveguide having a structure in which a radio wave is not leaked through a coupling surface of two bodies forming a waveguide and may be closely coupled to a test measuring instrument for checking performance of the waveguide.

Technical Solution

In order to achieve the object, a waveguide according to an exemplary embodiment of the present disclosure includes a first body and a second body injected-molded and having metal-coated surfaces and coupled in the up-down or left-right direction to form a transmission space in which a radio wave is movable in a longitudinal direction, and a first coupling surface and a second coupling surface being in surface contact with each other when the first body and the second body are coupled, in which the first coupling surface and the second coupling surface are formed with projections and grooves over the entire length adjacent to the transmission space, and the coupling surfaces has a bending structure in which the projections are engaged with the grooves.

At this time, the surfaces where the grooves and the projections are engaged with each other may be formed symmetrically at upper and lower sides or left and right sides of the transmission space, or the surfaces where the projections and the grooves are engaged with each other may be positioned at positions shifted from each other at the upper and lower sides or the left and right sides of the transmission space.

One or more transmission spaces may be formed, and each of coupling surfaces on an upper side of an uppermost transmission space and a lower side of a lowermost transmission space among the transmission spaces may have a bending structure.

To achieve the object, a waveguide according to an exemplary embodiment of the present disclosure may include a first body and a second body injected-molded and having metal-coated surfaces and coupled in the up-down or left-right direction to form a transmission space in which a radio wave is movable in a longitudinal direction, a first coupling surface and a second coupling surface being in surface contact with each other when the first body and the second body are coupled, and a coupling body bonding the first coupling surface and the second coupling surface. At this time, the coupling body is a bonding material that epoxy-bonds the first coupling surface and the second coupling surface when the first body and the second body are coupled.

The waveguide according to the exemplary embodiment of the present disclosure may further include a plurality of coupling grooves formed to be recessed in at least one of the first coupling surface and the second coupling surface, and a coupling body that is a bonding material disposed in the coupling groove to epoxy-bond the first coupling surface and the second coupling surface when the first body and the second body are coupled.

The waveguide according to the exemplary embodiment of the present disclosure may further include one or more first pinholes formed in the first body, a second pinhole formed in the second body to be communicable with the first pinhole, and a guide pin inserted into the first pinhole to protrude therefrom and inserted into the second pinhole when the first body and the second body are coupled to guide a coupling position of the second body with respect to the first body.

According to the waveguide according to the exemplary embodiment of the present disclosure, an outer surface of the first body and an outer surface of the second body may be provided with a locking step and a locking hook, and the locking hook may be locked to the locking step when the first body and the second body are coupled.

According to the waveguide according to the exemplary embodiment of the present disclosure, the first body and the second body may be coupled and a waveguide part to form a waveguide part and coupling flange parts, which are connected to a measuring instrument, formed on both ends of the waveguide part, and the transmission space may be formed to penetrate the waveguide part and the coupling flange parts.

At this time, the coupling flange part may be fixed to a connection flange part of the measuring instrument by bolting to communicate the transmission space with a transmission rod of the connection flange part, and the coupling flange part and the connection flange part may have contact surfaces with the same shape to be in surface contact with each other.

The coupling flange part may include an embossed portion formed by forming a periphery around which the transmission space is exposed to the outside in an embossed shape; and an engraved portion formed by forming the rim of the embossed portion in an engraved shape recessed relatively compared to the embossed portion, and the coupling flange part may include an embossed rim portion formed by forming the rim of the engraved portion in an embossed shape at the same height as that of the embossed portion.

The coupling flange part may further include an embossed portion formed by forming a periphery around which the transmission space is exposed to the outside in an embossed shape and an engraved portion formed by forming the rim of the embossed portion in an engraved portion recessed relatively compared to the embossed portion, and a plurality of bolt holes for bolting with the connection flange part of the measuring instrument may be formed at certain intervals, and the bolt hole may be formed in the engraved portion.

The waveguide according to the exemplary embodiment of the present disclosure may further include a plurality of first assembling holes and second assembling holes formed to correspond to the first body and the second body in order to closely assemble the waveguide part and bolts penetrating the first assembling holes and the second assembling holes, some of which are fastened in a direction from the first body to the second body and the others of which are fastened in a direction from the second body to the first body.

Advantageous Effects

According to the present disclosure, the waveguide may be manufactured by metal-coating and then bonding the two bodies injection-molded with the polymer material, so that it is possible to manufacture the waveguide with excellent performance by forming the coupling surfaces where the two bodies are engaged with each other in the bending structure to improve adhesion, thereby being firmly coupled without eccentricity and preventing the radio wave from being lost.

In addition, the waveguide according to the present disclosure may be formed in the shape in which the coupling flange parts formed on both sides of the waveguide each include the embossed portion, the engraved portion, and the embossed rim portion, and the connection flange part between the transmission tube and the reception tube of the measuring instrument may be also formed in the same shapes as those of the coupling flange part formed on both sides of the waveguide, so that the waveguide may be closely coupled to the transmission tube and the reception tube of the measuring instrument. Therefore, it is possible to prevent the radio wave from being leaked on the coupling surface with the test measuring instrument for checking the performance of the waveguide, thereby increasing the accuracy of the performance test of the waveguide.

In addition, according to the present disclosure, the two bodies may be additionally coupled by the structure of the locking hook and the locking step, thereby firmly maintaining the state where the two bodies are closely bonded.

Therefore, according to present disclosure, it is possible to manufacture the waveguide with excellent performance that prevents the radio wave from being lost.

In addition, the waveguide according to the present disclosure may be formed in the shape in which the coupling flange parts formed on both sides of the waveguide each include the embossed portion, the engraved portion, and the embossed rim portion, and the connection flange part between the transmission tube and the reception tube of the measuring instrument may be also formed in the same shapes as those of the coupling flange part formed on both sides of the waveguide, so that the waveguide may be closely coupled to the transmission tube and the reception tube of the measuring instrument.

Therefore, according to the present disclosure, it is possible to prevent the radio wave from being leaked on the coupling surface with the test measuring instrument for checking the performance of the waveguide and increase the accuracy of the waveguide performance test.

DESCRIPTION OF DRAWINGS

FIG. 1 is a diagram showing a state where a waveguide according to a first exemplary embodiment of the present disclosure is connected to a test measuring instrument.

FIG. 2 is a perspective diagram showing the waveguide according to the first exemplary embodiment of the present disclosure.

FIG. 3 is an exploded perspective diagram of the waveguide according to the first exemplary embodiment of the present disclosure.

FIG. 4 shows a first exemplary embodiment of a cross-sectional diagram taken along line A-A of FIG. 3 and a coupling diagram of the cross-section A-A.

FIG. 5 shows another first exemplary embodiment of a cross-sectional diagram taken along line A-A of FIG. 3 and a coupling diagram of the cross-section A-A.

FIG. 6A is a front diagram showing a first connection flange part of a transmission tube as the first exemplary embodiment of the present disclosure.

FIG. 6B is a front diagram showing a first coupling flange part formed on one side of the waveguide assembled with the first connection flange part as the first exemplary embodiment of the present disclosure.

FIG. 7A is a front diagram showing a second connection flange part of a reception tube as the first exemplary embodiment of the present disclosure.

FIG. 7B is a front diagram showing a second coupling flange part formed on the other side of the waveguide assembled with the second connection flange part as the first exemplary embodiment of the present disclosure.

FIG. 8 is a diagram showing a state where a waveguide according to a second exemplary embodiment of the present disclosure is connected to the test measuring instrument.

FIG. 9 is a perspective diagram showing the waveguide according to the second exemplary embodiment of the present disclosure.

FIG. 10 is an exploded perspective diagram of the waveguide according to the second exemplary embodiment of the present disclosure.

FIG. 11 is a plan diagram showing a second body forming the waveguide according to the second exemplary embodiment of the present disclosure.

FIG. 12 is a coupling diagram of a cross section A-A' of FIG. 10.

FIG. 13 is a coupling diagram of a cross section B-B' of FIG. 10.

FIG. 14A is a front diagram showing a first connection flange part of a transmission tube as the second exemplary embodiment of the present disclosure.

FIG. 14B is a front diagram showing a first coupling flange part formed on one side of the waveguide assembled with a first connection flange part as the second exemplary embodiment of the present disclosure.

FIG. 15A is a front diagram showing a second connection flange part of the reception tube as the second exemplary embodiment of the present disclosure.

FIG. 15B is a front diagram showing a second coupling flange part formed on the other side of the waveguide assembled with a second connection flange part as the second exemplary embodiment of the present disclosure.

BEST MODE

Hereinafter, a first exemplary embodiment of the present disclosure will be described in detail with reference to the accompanying drawings.

As shown in FIG. 1, a waveguide 100 according to the present disclosure is connected to a test measuring instrument (hereinafter, referred to as 'measuring instrument') to measure performance. The performance measurement of the waveguide 100 is to measure the radio wave transmission characteristics of the waveguide 100 and tests whether a radio wave is leaked while the waveguide 100 manufactured as a prototype transmits the radio wave.

The waveguide 100 is manufactured by metal-coating two or more components injection-molded with a polymer material and then bonding them. Although the waveguide 100 manufactured by the above method has advantages such as reducing the weight and facilitating manufacturing, the radio wave may be leaked in the coupling portion. Therefore, the waveguide 100 manufactured as the prototype before mass production is connected to a measuring instrument 10 to measure the performance.

The measuring instrument 10 includes a transmission device 11 configured to transmit the radio wave and a reception device 12 configured to receive the transmitted radio wave. The waveguide 100 is installed to connect between a transmission tube 20 assembled to the transmission device 11 and a reception tube 30 assembled to the reception device 12.

When the waveguide 100 is installed to connect between the transmission tube 20 and the reception tube 30, the measuring instrument 10 transmits the radio wave from the transmission device 11 to allow the transmitted radio wave to flow into the reception device 12 through the transmission tube 20, the waveguide 100, and the reception tube 30. In this process, whether the radio wave is lost in the waveguide 100 is tested by comparing the radio wave transmitted by the transmission device 11 and the radio wave received by the reception device 12.

The measuring instrument 10 is provided with connecting flange parts 21, 31 for connecting the waveguide 100 in the transmission tube 20 and the reception tube 30, and the connecting flange parts 21, 31 are each connected to coupling flange parts 100*b*, 100*c* formed on one side and the other side of the waveguide 100 by bolting. The transmission tube 20 and the reception tube 30 are made of metal and integrally manufactured because the radio wave should not be leaked therein. Specifically, the transmission tube 20 and the reception tube 30 are made of perfect conductors to block the radio wave from being leaked through the transmission tube 20 and the reception tube 30, thereby increasing the accuracy of the performance test of the waveguide 100.

The transmission tube 20 and the reception tube 30 are each connected to the transmission device 11 and the reception device 12 by bolting, and a portion where the transmission tube 20 is bolted to the transmission device 11 and a portion where the reception tube 30 is bolted to the reception device 12 may be closely coupled not to leak the radio wave and a gasket, etc. may be applied thereto, thereby increasing airtightness.

The transmission tube 20 and the reception tube 30 are formed with transmission rods (reference numeral 23 in FIG. 6A and reference numeral 33 in FIG. 7A), which are paths through which the radio wave is moved, in the longitudinal direction. The transmission rods of the transmission tube 20 and the reception tube 30 may communicate with a transmission space (reference numeral 130 in FIG. 2) of the waveguide 100 so that the radio wave transmitted from the transmission device 11 is received by the reception device 12 through the transmission tube 20, the waveguide 100, and the reception tube 30.

Meanwhile, the waveguide 100 according to a first exemplary embodiment of the present disclosure is formed in a shape in which two or more bodies injection-molded and having metal-thin-film-coated surfaces are coupled and a waveguide part 100*a* and the coupling flange parts 100*b*, 100*c* formed on both ends of the waveguide part 100*a* are included. The waveguide 100 is formed with the transmission space (reference numeral 130 in FIG. 2) in which the radio wave may move by penetrating the waveguide part 100*a* and the coupling flange parts 100*b*, 100*c*.

As shown in FIG. 2, the waveguide 100 according to the first exemplary embodiment of the present disclosure is formed by coupling a first body 110 and a second body 120 in the up-down or left-right direction. The first body 110 and the second body 120 are coupled to form the transmission space 130 in which the radio wave may move in the longitudinal direction. The transmission space 130 communicates with the transmission rod of the measuring instrument 10.

One or more transmission spaces 130 may be formed. When one or more transmission spaces 130 of the waveguide 100 are formed, the transmission tube 20 and the reception tube 30 having the transmission rod corresponding to the number and position of the transmission space 130 of the waveguide 100 may be installed on the measuring instrument 10 to test the performance of the waveguide 100.

According to the first exemplary embodiment, the waveguide 100 having one transmission space 130 will be described as an example.

The first body 110 and the second body 120 are injection-molded and have the metal-coated surfaces. The injection-molding is to reduce the weight of the waveguide 100 and facilitate the manufacturing thereof, and the metallic coating on the surface is to transmit the radio wave.

When the surfaces of the first body 110 and the second body 120 are coated with a metal having high conductivity, the radio wave may be efficiently transmitted and received. Since the radio wave has directivity by being in contact with metal while passing through the transmission space 130, it is necessary to have the metal-coated surfaces when the first body 110 and the second body 120 are manufactured by injection-molding.

When the waveguide 100 is manufactured as a single body by injection-molding and metal-coated, the uniform metal coating is difficult in the transmission space 130, thereby lowering the radio wave transmission characteristics. Therefore, the waveguide 100 in which the transmission space 130 is formed is manufactured by separately injection-molding two or more bodies so that the metal coating of the surface forming the transmission space 130 is uniform, and metal-coating and then coupling each of surfaces of two or more bodies injection-molded.

The first body 110 and the second body 120 may be made of various polymer materials. For example, the first body 110 and the second body 120 may be made of a polymer material, such as PI, PEI, PPO, or ABC, which is heat-resistance for injection-molding, and preferably, may be made of a PEI material. The PEI has no problem of metal peeling after coating because it has excellent coupling strength with the metal coated on the first body 110 and the second body 120.

The metal coated on the first body 110 and the second body 120 may be made of one or more selected from copper, silver, gold, and nickel.

As shown in FIGS. 2 and 3, the waveguide 100 includes a first coupling surface 111 and a second coupling surface 121, which are in surface contact with each other, so that the transmission space 130 is formed in the center in the longitudinal direction when the first body 110 and the second body 120 are coupled. According to the first exemplary embodiment, the first coupling surface 111 is formed on the first body 110 and the second coupling surface 121 is formed on the second body 120. The first coupling surface 111 and the second coupling surface 121 are closely coupled to form the transmission space 130 therebetween in the longitudinal direction.

According to the first exemplary embodiment, a recess 110*a* formed in the first body 110 in the longitudinal direction and a recess 120*a* formed in the second body 120 in the longitudinal direction are engaged with each other to form the transmission space 130. The transmission space 130 may have various cross-sectional shapes, such as a semicircle, a square, and an ellipse. According to the first exemplary embodiment, the transmission space 130 is formed in a rectangular cross-section.

The first coupling surface 111 and the second coupling surface 121 are formed with projections 113, 125 and grooves 115, 123 over the entire length adjacent to each of the recesses 110*a*, 120*a* forming the transmission space 130 and these projections 113, 125 and the grooves 115, 123 are engaged with each other to form a bending structure.

When the coupling surfaces where the first body 110 and the second body 120 are engaged with each other are formed in the bending structure, adhesion may be improved and eccentricity may be prevented, thereby preventing the radio wave from being lost through the coupling portion of the first body 110 and the second body 120.

Since the radio wave is transmitted through a space, the radio wave is not leaked between the first coupling surface 111 and the second coupling surface 121 when the adhesion between the first coupling surface 111 and the second coupling surface 121 is improved. In addition, the conductor loses the radio wave, and an insulating material may be formed between an inner wall (conductor) forming the transmission space 130 and an outer wall (conductor) of the waveguide 100, thereby preventing the radio wave from being lost through the inner wall forming the transmission space 130.

The bending structure may be formed at positions where the surfaces where the projections 113, 125 and the grooves 115, 123 are engaged with each other are shifted from each other at upper and lower sides or left and right sides of the transmission space 130. When the surfaces where the projections 113, 125 and the grooves 115, 123 are engaged with each other are formed at the positions where they are shifted from each other at the upper and lower sides or left and right sides of the transmission space 130, it is possible to prevent the radio wave from being lost through the coupling portion.

Two or more surfaces where the projections 113, 125 and the grooves 115, 123 are engaged with each other may be formed. The surfaces where the projections 113, 125 and the grooves 115, 123 are engaged with each other may be positioned at the positions where they are shifted from each other at the upper and lower sides or left and right sides of the transmission space 130 and symmetrical to each other.

According to the first exemplary embodiment, the bending structure is formed by engaging the projection 113 of the first coupling surface 111 with the groove 123 of the second coupling surface 121 and engaging the groove 115 of the first coupling surface 111 with the projection 125 of the second coupling surface 121.

The projection 113 of the first coupling surface 111 is elongated in the longitudinal direction above the recess 110*a* elongated in the longitudinal direction in the first body 110, and the groove 115 of the first coupling surface 111 is elongated in the longitudinal direction under the recess 110*a*. The groove 123 of the second coupling surface 121 is formed above the recess 120*a* elongated in the longitudinal direction in the second body 120, and the projection 125 of the second coupling surface 121 is elongated in the longitudinal direction under the recess 120*a*.

Therefore, the surfaces where the first coupling surface 111 and the second coupling surface 121 are engaged with each other has a structure having once or more bends in the longitudinal direction at the upper and lower sides of the transmission space 130. This is to prevent the radio wave from being leaked by forming both the coupling surfaces at the upper and lower sides of the transmission space 130 with the structure closely coupled. When the first coupling surface 111 and the second coupling surface 121 are coupled in a planar-to-planar structure without the bending structure, eccentricity may occur due to a factor such as surface roughness.

When eccentricity occurs on the coupling surface when the first body 110 and the second body 120 are coupled, the radio wave is leaked through a gap therebetween and the radio wave is lost. It is important that the waveguide 100 does not lose the radio wave when transmitting the radio wave through the transmission space 130. Therefore, the bending structure may be formed in the longitudinal direction so that both the coupling surfaces at the upper and lower sides of the transmission space 130 are closely coupled.

Two or more surfaces where the projections 113, 125 and the grooves 115, 123 are engaged with each other are formed, so that the bending structure formed by the first coupling surface 111 and the second coupling surface 121 has twice or more bends. For example, the surfaces where the first coupling surface 111 and the second coupling surface 121 are engaged with each other may have a structure that is curved twice or more at the upper and lower sides of the transmission space 130.

The projections 113, 125 and the grooves 115, 123 may be formed as a projection having a semicircular cross section and a semicircular groove corresponding to the projection having the semicircular cross section, or formed as a projection having a rectangular cross-section and a rectangular groove corresponding to the projection having the rectangular cross section.

Although not shown, one or more transmission spaces 130 may be formed.

When the one or more transmission spaces are formed, it is preferable that the coupling surfaces on an upper side of an uppermost transmission space and on a lower side of a lowermost transmission space each form the bending structure. In this case, the bending structure may be formed as the bending structure having one or more structures in which the projections and the grooves are engaged with each other.

A fixing means may be used to assemble the first body 110 and the second body 120.

The fixing means includes a first assembling hole 141, a second assembling hole 143, an assembling bolt 145, and an assembling nut 147.

As shown in FIG. 3 and FIG. 4, a plurality of first assembling holes 141 and a plurality of second assembling holes 143 may be formed to correspond to the first body 110 and the second body 120. The assembling bolt 145 is fastened by penetrating the first assembling hole 141 and the second assembling hole 143. The assembling nut 147 is fastened to the end of the assembling bolt 145 having penetrated the first assembling hole 141 and the second assembling hole 143.

The first assembling hole 141 may also be formed in the first body 110 or formed in the second body 120. The first assembling hole 141 is formed in a step shape so that a head of the assembling bolt 145 may be inserted and positioned, and the second assembling hole 143 is formed in a straight shape so that a screw portion of the assembling bolt 145 may penetrate the second assembling hole 143. The step shape of the first assembling hole 141 prevents the head of the assembling bolt 145 from being exposed to an outer surface of the first body 110 or the second body 120.

According to the first exemplary embodiment, when the first assembling hole 141 is formed in the first body 110, the second assembling hole 143 corresponding to the first assembling hole 141 of the first body 110 is formed in the second body 120. In addition, when the first assembling hole 141 is formed in the second body 120, the second assembling hole 143 corresponding to the first assembling hole 141 of the second body 120 is formed in the first body 110.

When the first assembling holes 141 are uniformly formed in the first body 110 and the second body 120, some of the plurality of assembling bolts 145 are tightened in a direction from the first body 110 to the second body 120, and the others are tightened in a direction from the second body 120 to the first direction 110 to tighten both sides of the waveguide 100 by a uniform force, so that it is easier to closely couple the first body 110 to the second body 120.

As shown in FIG. 4, the assembling bolts 145 are fastened in the direction from the first body 110 to the second body 120 at positions where the first assembling hole 141 is formed in the first body 110 and the second assembling hole 143 is formed in the second body 120.

In addition, the assembling bolt 145 is fastened in the direction from the second body 120 to the first body 110 at positions where the first assembling hole 141 is formed in the second body 120 and the second assembling hole 143 is formed in the first body 110.

When the assembling bolts 145 are fastened to each of the plurality of first assembling holes 141 and second assembling holes 143 formed in the first body 110 and the second body 120 so that the assembling bolt 145 is tightened in the direction from the first body 110 to the second body 120 and the assembling bolt 145 is tightened in the direction from the second body 120 to the first body 110, the first body 110 and the second body 120 are closely coupled. In this process, the first coupling surface 111 and the second coupling surface 121 may be tightly closely coupled without eccentricity due to the bending structure.

Therefore, the coupling surfaces at the upper and lower sides of the transmission space 130 formed by engaging the recess **110*a* of the first body 110 with the recess 110*b* of the second body 120** may have a structure having once or more bends to be closely coupled, thereby preventing the radio wave from being leaked through the coupling surfaces.

The waveguide 100 is formed by coupling the first body 110 and the second body 120. The first body 110 and the second body 120 are coupled by fastening the assembling bolt 145 to the first assembling hole 141 and the second assembling hole 143 formed in the first body 110 and the second body 120 and fastening the assembling nut 147 to the end of the assembling bolt 145 having penetrated the first assembling hole 141 and the second assembling hole 143 in a state where the first coupling surface 111 and the second coupling surface 121 are closely coupled.

As another first exemplary embodiment, as shown in FIG. 5, the fixing means may include the first assembling hole 141, the second assembling hole 143, and a screw bolt **145*a***.

The screw bolts **145*a* penetrate the first and second assembling holes 141, 143, and some are fastened in the direction from the first body 110 to the second body 120, and the others are fastened in the direction from the second body 120 to the first body 110**.

The screw bolts **145*a* are fastened by performing evenly and alternately the order of being fastened in the direction from the first body 110 to the second body 120 and fastened in the direction from the second body 120 to the first body 110 so that the first body 110 and the second body 120 are not misaligned at the correct positions where the first body 110 and the second body 120** are coupled.

In addition, the number of screw bolts **145*a* fastened in the direction from the first body 110 to the second body 120 and the number of screw bolts 145*a* fastened in the direction from the second body 120 to the first body 110** are the same.

The screw bolt **145*a* closely couples the first body 110 and the second body 120** by increasing a frictional force to increase a fastening force so that it is possible to implement a strong anti-loosening effect even without fastening a nut and shorten a working time.

The second assembling hole 143 to which the end of the screw bolt **145*a* is fastened may have a relatively smaller inner diameter dimension than that of the first assembling hole 141, thereby increasing the fastening force at which the screw bolt 145*a* is fastened to the second assembling hole 143**.

Referring to FIG. 2, the waveguide 100 formed by coupling the first body 110 and the second body 120 has a shape in which the waveguide part **100*a* and the coupling flange parts 100*b*, 100*c* formed on both ends of the waveguide part 100*a* are formed, and the transmission space 130 is formed to penetrate the waveguide part 100*a* and the coupling flange parts 100*b*, 100*c* formed on both ends of the waveguide part 100*a***.

According to the first exemplary embodiment, the waveguide part **100*a* is formed in a rectangular cross-sectional shape, and the coupling flange parts 100*b*, 100*c* formed on both ends of the waveguide part 100*a* are formed in a relatively greater rectangular cross-sectional shape than the cross section of the waveguide part 100*a*. The coupling flange parts 100*b*, 100*c* formed on both ends of the waveguide part 100*a* are configured to connect the waveguide 100 to the measuring instrument 10**.

The coupling flange parts **100*b*, 100*c* formed on both ends of the waveguide part 100*a* are fixed to the connection flange parts (reference numerals 21, 31 in FIG. 1) of the measuring instrument 10 by bolting to communicate the transmission space 130 with transmission rods (reference numeral 23 in FIG. 6A and reference numeral 33 in FIG. 7A) of the connection flange parts 21, 31**.

As shown in FIGS. 2 and 3, the coupling flange parts **100*b*, 100*c* are formed in a shape in which a connection surface 150 includes an embossed portion 151, an engraved portion 153, and an embossed rim portion 155**.

Specifically, the coupling flange parts **100*b*, 100*c* include the embossed portion 151 formed by forming a periphery around which the transmission space 130 is exposed to the outside in an embossed shape, and include the engraved portion 153 formed by forming the rim of the embossed portion 151 in an engraved shape recessed relatively compared to the embossed portion 151**.

In addition, the coupling flange parts **100*b*, 100*c* further include the embossed rim portion 155 formed by forming the rim of the engraved portion 153 in an embossed shape at the same height as that of the embossed portion 151**.

When the coupling flange parts 100*b*, 100*c* connected to the measuring instrument 10 are coupled in the planar-to-planar structure, eccentricity occurs in a portion where the measuring instrument 10 and the waveguide 100 are in contact with each other, so that a void may occur, thereby losing the radio wave. The closely coupling is difficult when the coupling is made in a straight-line structure in which the plane and the plane are in contact with each other because the surfaces thereof may be curved or rough due to the characteristics of the injection-molded products.

Therefore, the connection surfaces 150 of the coupling flange parts 100*b*, 100*c* bonded to the connection flange parts 21, 31 of the measuring instrument 10 are formed in a structure in which the embossed portion 151, the engraved portion 153, and the embossed rim portion 155 are repeated so that the coupling flange parts 100*b*, 100*c* may be closely coupled to the connection flange parts 21, 31 of the measuring instrument 10. The embossed portion 151 and the engraved portion 153 are formed in a circular shape. The embossed rim portion 155 has only the portion connected to the engraved portion 153 formed in the circular shape.

According to the first exemplary embodiment, the widths of the embossed portion 151 and the engraved portion 153 are similar but the ratio thereof is adjustable. For example, the width of the engraved portion 153 may also be relatively narrower than that of the embossed portion 151, and the areas of the embossed portion 151 and the embossed rim portion 155 may also be relatively wider than that of the engraved portion 153 so that portions in surface contact with the measuring instrument 10 may also be formed as much as possible when being connected to the measuring instrument 10.

As shown in FIGS. 6A, 6B, 7A, and 7B, the surfaces where the connection flange parts 21, 31 of the measuring instrument 10 are in contact with the coupling flanges parts 100*b*, 100*c* formed on both sides of the waveguide 100 are formed in the same shape so that they are in surface contact with each other. Specifically, the connection flange parts 21, 31 are also formed in a structure in which the embossed portion 151, the engraved portion 153, and the embossed rim portion 155 are repeated as in the coupling flange parts 100*b*, 100*c*.

The coupling flange parts 100*b*, 100*c* are formed with a plurality of bolt holes 160 for bolting with the connection flange parts 21, 31. The plurality of bolt holes 160 are formed at set intervals in the engraved portions 153 of the coupling flange parts 100*b*, 100*c*. When the bolt hole 160 is formed in the engraved portion 153, the connection flange parts 21, 31 and the coupling flange parts 100*b*, 100*c* may be more closely tightened and fixed.

As shown in FIGS. 6A and 6B, the coupling flange part 100*b* formed on one side of the waveguide 100 is coupled to the connection flange part 21 of the transmission tube 20. The connection flange part 21 and the coupling flange part 100*b* formed on one side of the waveguide 100 are formed in the same shape.

The connection flange part 21 of the transmission tube 20 has an embossed portion 25*a* formed around the transmission rod 23, an engraved portion 25*b* formed on the rim of the embossed portion 25*a*, and an embossed rim portion 155 formed on the rim of the engraved portion 25*b*. Bolt holes 27 are formed at certain intervals in the engraved portion 25*b*.

The coupling flange part 100*b* formed on one side of the waveguide 100 has the embossed portion 151 formed around the transmission space 130, the engraved portion 153 formed on the rim of the embossed portion 151, and the embossed rim portion 155 formed on the rim of the engraved portion 153. A bolt hole 160 corresponding to the bolt hole 27 of the transmission tube 20 is formed in the engraved portion 153.

The embossed portion 25*a*, the engraved portion 25*b*, and the embossed rim portion 25*c* of the connection flange part 21 are formed in the same shapes as those of the embossed portion 151, the engraved portion 153, and the embossed rim portion 155 of the coupling flange part 100*b*.

When the coupling flange part 100*b* formed on one side of the waveguide 100 is connected to the connection flange part 21 of the transmission tube 20, the embossed portion 25*a* of the connection flange part 21 and the embossed portion 151 of the coupling flange part 100*b* formed on one side of the waveguide 100 are closely coupled, and the embossed rim portion 25*c* of the connection flange part 21 and the embossed rim portion 155 of the coupling flange part 100*b* formed on one side of the waveguide 100 are closely coupled.

In this state, when the fixing bolts are fastened to penetrate the bolt hole 27 formed in the engraved portion 25*b* of the connection flange part 21 and the bolt hole 160 formed in the engraved portion 153 of the coupling flange part 100*b*, the fixing nuts are fastened and tightened to the ends of the fixing bolts having penetrated the two bolt holes 27, 160, so that the embossed portion 25*a* of the connection flange part 21 and the embossed portion 151 of the coupling flange part 100*b* formed on one side of the waveguide 100 may be closely coupled, and the embossed rim portion 25*c* of the connection flange part 21 and the embossed rim portion 155 of the coupling flange part 100*b* formed on one side of the waveguide 100 may be closely coupled.

When the fixing bolts and the fixing nuts are fastened and tightened to the engraved portion 25*b* of the connection flange part 21 and the engraved portion 153 of the coupling flange part 100*b*, the fixing bolts and the fixing nuts compress and tighten an empty space between the two engraved portions, so that the force of tightening the fixing bolt may increase, thereby increasing the adhesion of the portion in contact with each other.

As shown in FIGS. 7A and 7B, the coupling flange part 100*c* formed on the other side of the waveguide 100 is coupled to the connection flange part 31 of the reception tube 30. The connection flange part 31 and the coupling flange part 100*c* formed on the other side of the waveguide 100 are formed in the same shape.

An embossed portion 35*a*, an engraved portion 35*b*, and an embossed rim portion 35*c* of the connection flange part 31 of the reception tube 30 are formed in the same shapes as those of the embossed portion 151, the engraved portion 153, and the embossed rim portion 155 of the coupling flange part 100*c* formed on the other side of the waveguide 100.

When the coupling flange part 100*c* formed on the other side of the waveguide 100 is connected to the connection flange part 31 of the reception tube 30, the embossed portion 35*a* of the connection flange part 31 and the embossed portion 151 of the coupling flange part 100*c* formed on the other side of the waveguide 100 are closely coupled, and the embossed rim portion 35*c* of the connection flange part 31 and the embossed rim portion 155 of the coupling flange part 100*c* formed on the other side of the waveguide 100 are closely coupled.

In this state, when the fixing bolts are fastened to penetrate the bolt hole 37 formed in the engraved portion 35*b* of the connection flange part 31 and the bolt hole 160 formed in the engraved portion 153 of the coupling flange part 100*c*, the fixing nuts are fastened and tightened to the ends of the fixing bolts having penetrated the two bolt holes 37, 160, so that the embossed portion 35*a* of the connection flange part 31 and the embossed portion 151 of the coupling flange part 100*c* formed on the other side of the waveguide 100 may be closely coupled and the embossed rim portion 35*c* of the connection flange part 31 and the embossed rim portion 155 of the coupling flange part 100*b* formed on the other side of the waveguide 100 may be closely coupled.

When the fixing bolts and the fixing nuts are fastened and tightened to the engraved portion 35*b* of the connection flange part 31 and the engraved portion 153 of the coupling flange part 100*c*, the fixing bolts and the fixing nuts compress and tighten an empty space between the two engraved portions, so that the force of tightening the fixing bolt may increase, thereby increasing the adhesion of the portion in contact with each other.

Therefore, the waveguide 100 may be closely coupled to the transmission tube 20 and the reception tube 30 of the measuring instrument 10 for checking the performance of the waveguide 100. When the waveguide 100 is closely coupled to the measuring instrument 10, it is possible to accurately test whether the waveguide 100 manufactured as the prototype leaks the radio wave while transmitting the radio wave.

In addition, according to the present disclosure, the waveguide may be manufactured by metal-coating the first body 110 and the second body 120 injection-molded with the polymer material and then bonding them, so that it is possible to manufacture the waveguide with excellent performance by forming the coupling surfaces where the two bodies 110, 120 are engaged with each other in the bending structure to improve the adhesion, thereby preventing the radio wave from being lost.

In addition, according to the present disclosure, the waveguide is manufactured by fastening the assembling bolts with the assembling nuts to couple the first body 110 to the second body 120, and some of the assembling bolts are tightened in a direction from the first body 110 to the second body 120, and the others are tightened in the direction from the second body 120 to the first body 110 to tighten both sides of the waveguide 100 with the uniform force, so that the two bodies may be closely coupled without eccentricity.

Hereinafter, a second exemplary embodiment of the present disclosure will be described in detail with reference to the accompanying drawings.

As shown in FIG. 8, a waveguide 200 according to the present disclosure is connected to a test measuring instrument (hereinafter, referred to as 'measuring instrument') to measure performance. The performance measurement of the waveguide 200 is to measure the radio wave transmission characteristics of the waveguide 200 and tests whether a radio wave is leaked while the waveguide 200 manufactured as a prototype transmits the radio wave.

The waveguide 200 is manufactured by metal-coating two or more components injection-molded with a polymer material and then bonding them. Although the waveguide 200 manufactured by the above method has advantages such as reducing the weight and facilitating manufacturing, the radio wave may be leaked in the coupling portion. Therefore, the waveguide 200 manufactured as the prototype before mass production is connected to the measuring instrument 10 to measure the performance.

The measuring instrument 10 includes the transmission device 11 configured to transmit the radio wave and the reception device 12 configured to receive the transmitted radio wave. The waveguide 200 is installed to connect between the transmission tube 20 assembled to the transmission device 11 and the reception tube 30 assembled to the reception device 12.

When the waveguide 200 is installed to connect between the transmission tube 20 and the reception tube 30, the measuring instrument 10 allows the transmission device 11 to transmit the radio wave and the transmitted radio wave to be introduced into the reception device 12 through the transmission tube 20, the waveguide 200, and the reception tube 30. In this process, whether the radio wave is lost in the waveguide 200 is tested by comparing the radio wave transmitted by the transmission device 11 and the radio wave received by the reception device 12.

The measuring instrument 10 has the first connection flange part 21 provided in the transmission tube 20 and the second connection flange part 31 provided in the reception tube 30. The first connection flange part 21 and the second connection flange part 31 are configured to connect the waveguide 200 to the transmission tube 20 and the reception tube 30.

The first connection flange part 21 of the transmission tube 20 is connected to the coupling flange part 200*b* formed on one side of the waveguide 200 by bolting, and the second connection flange part 31 of the reception tube 30 is connected to the coupling flange part 200*c* formed on the other side of the waveguide 200 by bolting.

The transmission tube 20 and the reception tube 30 are made of metal and integrally manufactured because the radio wave should be not leaked therein. Specifically, the transmission tube 20 and the reception tube 30 are made of a perfect conductor to block the radio wave from being leaked through the transmission tube 20 and the reception tube 30, thereby increasing the accuracy of the performance test of the waveguide 200.

The transmission tube 20 and the reception tube 30 may be each connected to the transmission device 11 and the reception device 12 by bolting, and a portion where the transmission tube 20 is fastened to the transmission device 11 by bolting and a portion where the reception tube 30 is fastened to the reception device 12 by bolting may be closely coupled to prevent the radio wave from being leaked, and a gasket, etc. may be applied thereto, thereby increasing airtightness.

The transmission tube 20 and the reception tube 30 are formed with transmission rods (reference numeral 23 in FIG. 14A and reference numeral 33 in FIG. 15A), which are paths through which the radio wave is moved, in the longitudinal direction. The transmission rods 23, 33 of the transmission tube 20 and the reception tube 30 communicate with the transmission space (reference numeral 230 in FIG. 9) of the waveguide 200, so that the radio wave transmitted from the transmission device 11 may be received by the reception device 12 through the transmission tube 20, the waveguide 200, and the reception tube 30.

Meanwhile, the waveguide 200 according to the second exemplary embodiment of the present disclosure is formed by coupling two bodies or more injection-molded and having metal-coated surfaces in the up-down or left-right direction. The waveguide 200 is formed in a shape including a waveguide part 200*a* and coupling flange parts 200*b*, 200*c* formed on both ends of the waveguide part 200*a*. The waveguide 200 is formed with a transmission space (reference numeral 230 in FIG. 9) in which the radio wave may move by penetrating a waveguide part 200*a* and coupling flange parts 200*b*, 200*c*.

As shown in FIG. 9, the waveguide 200 according to the second exemplary embodiment of the present disclosure is formed by vertically coupling a first body 210 and a second body 220. The first body 210 and the second body 220 are coupled to form the transmission space 230 in which the radio wave may move in the longitudinal direction. The transmission space 230 communicates with the transmission rods (reference numeral 23 in FIG. 14A and reference numeral 33 in FIG. 15A) of the measuring instrument 10.

One or more transmission spaces 230 may be formed. When the one or more transmission spaces 230 of the waveguide 200 are formed, the transmission tube 20 and the reception tube 30 having the transmission rods corresponding to the number and position of the transmission space 230 of the waveguide 200 may be installed on the measuring instrument 10 to test the performance of the waveguide 200.

According to the second exemplary embodiment, the waveguide 200 having one transmission space 230 will be described as an example.

The first body 210 and the second body 220 are injection-molded and have the metal-coated surfaces. The injection-molding is to reduce the weight of the waveguide 200 and facilitate the manufacturing thereof, and the metallic coating on the surface is to transmit the radio wave.

When the surfaces of the first body 210 and the second body 220 are coated with a metal having high conductivity, the radio wave may be efficiently transmitted and received. Since the radio wave has directivity by being in contact with metal while passing through the transmission space 230, it is necessary to have the metal-coated surfaces when the first body 210 and the second body 220 are manufactured by injection-molding.

When the waveguide 200 is manufactured as a single body by injection-molding and metal-coated, the uniform metal coating is difficult in the transmission space 230, thereby lowering the radio wave transmission characteristics. Therefore, the waveguide 200 in which the transmission space 230 is formed is manufactured by being separately injection-molded into two or more bodies so that the metal coating of the surface forming the transmission space 230 is uniform, and metal-coating and then coupling each of surfaces of two or more bodies injection-molded.

The first body 210 and the second body 220 may be made of various polymer materials. For example, the first body 210 and the second body 220 are made of a polymer material, such as PI, PEI, PPO, or ABC, which is heat-resistant for injection-molding, and preferably may be made of a PEI material. The PEI has no problem of metal peeling after coating because it has excellent coupling strength with the metal coated on the first body 210 and the second body 220.

The metal coated on the first body 210 and the second body 220 may be made of one or more selected from copper, silver, gold, and nickel.

The first body 210 and the second body 220 are bonded without using a screw. When the first body 210 and the second body 220 are coupled by the screw, a firm coupling is possible but a slight gap may occur in the tightening process. When even the slight gap occurs between the first body 210 and the second body 220 forming the waveguide 200, the performance deteriorates rapidly. Therefore, there is a need for a structure of stably coupling the first body 210 and the second body 220.

The first body 210 and the second body 220 are coupled to each other in the bending structure for close coupling. In addition, the first body 210 and the second body 220 are bonded by a bonding material for stable coupling. In addition, the coupling structure of a locking hook 261 and a locking step 263 is added to the first body 210 and the second body 220 so that the closely coupled state therebetween is firmly maintained.

The coupling of the bending structure, the bonding, and the hook coupling structure of the first body 210 and the second body 220 will be described in detail below.

As shown in FIGS. 9 to 11, the waveguide 200 includes a first coupling surface 211 and a second coupling surface 221 being in surface contact with each other so that the transmission space 230 is formed in the longitudinal direction when the first body 210 and the second body 220 are coupled.

According to the second exemplary embodiment, the first coupling surface 211 is formed on the first body 210 and the second coupling surface 221 is formed on the second body 220. The first coupling surface 211 and the second coupling surface 221 are closely coupled and the transmission space 230 is formed therebetween in the longitudinal direction. The transmission space 230 may have various cross-sectional shapes such as a semicircle, a square, and an oval. According to the second exemplary embodiment, the transmission space 230 is formed in a rectangular cross-sectional shape.

According to the second exemplary embodiment, the first coupling surface 211 of the first body 210 and a recess **220*a* formed in the second body 220 are engaged with each other to form the transmission space 230. The recess 220*a* has a part of the second body 220 formed to be recessed at a position corresponding to the second coupling surface 211** in the entire longitudinal direction.

According to the second exemplary embodiment, the flat first coupling surface 211 of the first body 210 and the recess **220*a* formed in the second body 220 are engaged with each other to form the transmission space 230. Therefore, according to the second exemplary embodiment, the recess 220*a* is formed only in the second body 220. However, the recess of the first body 210 and the recess of the second body 220 may also be engaged with each other to form the transmission space by forming the recess in the first body 210 and the recess in the second body 220**.

The first coupling surface 211 and the second coupling surface 221 are formed with grooves 213 and projections 223 corresponding to the grooves 213 over the entire length adjacent to the transmission space 230, and the grooves 213 and the projections 223 are engaged with each other to form the bending structure.

Referring to FIGS. 10 and 12, according to the second exemplary embodiment, the projection 223 is formed on the second coupling surface 221 corresponding to both sides of the recess **220*a* in the longitudinal direction, and the groove 213 is formed to correspond to the first coupling surface 211 facing the projection 223**.

The projection 223 of the second coupling surface 221 is inserted into the groove 213 of the first coupling surface 211 when the second body 220 is coupled to the first body 210 so that the first coupling surface 211 and the second coupling surface 221 form the bending structure on portions corresponding to both sides of the transmission space 230.

When the coupling surfaces where the first body 210 and the second body 220 are engaged with each other are formed in the bending structure, adhesion may be improved and eccentricity may be prevented, thereby preventing the radio wave from being lost through the coupling portion of the first body 210 and the second body 220.

Since the radio wave is transmitted through a space, the radio wave is not leaked between the first coupling surface 211 and the second coupling surface 221 when the adhesion between the first coupling surface 211 and the second coupling surface 221 is improved. In addition, the conductor loses the radio wave, and an insulating material may be formed between an inner wall (conductor) forming the transmission space 230 and an outer wall (conductor) of the waveguide 200, thereby preventing the radio wave from being lost through the inner wall forming the transmission space 230.

According to the second exemplary embodiment, the first body 210 and the second body 220 are vertically coupled, and the surfaces where the projection 223 and the groove 213 are engaged with each other are formed symmetrically on the left and right sides of the transmission space 230. In addition, the bending structure is formed by engaging the groove 213 of the first coupling surface 211 with the projection 223 of the second coupling surface 221.

The projection 223 is formed in the entire longitudinal direction on the second coupling surface 221 corresponding to both sides of the recess 220*a* formed in the second body 220 in the longitudinal direction. The groove 213 is formed in the first coupling surface 211 at the position corresponding to the projection 223 in the entire longitudinal length. According to the second exemplary embodiment, the surfaces where the projection 223 and the groove 213 are engaged with each other are formed at positions symmetrical to each other on the left and right sides of the transmission space 230.

According to another second exemplary embodiment, the surfaces where the projection 223 and the groove 213 are engaged with each other may be formed at positions shifted from each other at the upper and lower sides or left and right sides of the transmission space 230. Alternatively, the surfaces where the projection 223 and the groove 213 are engaged with each other may be positioned at positions shifted from each other at the upper and lower sides or left and right sides of the transmission space 230 and symmetrical to each other.

Two or more surfaces where the projection 223 and the groove 213 are engaged with each other may be formed. In this case, the surfaces where the first coupling surface 211 and the second coupling surface 221 are engaged with each other may have a structure having once or more bends on the left and right sides of the transmission space 230 in the longitudinal direction. This is to prevent the radio wave from being leaked by forming both the left and right coupling surfaces of the transmission space 230 in a closely coupling structure. When the first coupling surface 211 and the second coupling surface 221 are coupled in a planar-to-planar structure without the bending structure, eccentricity may occur due to a factor such as surface roughness.

When eccentricity occurs on the coupling surface when the first body 210 and the second body 220 are coupled, the radio wave is leaked through a gap therebetween and the radio wave is lost. It is important that the waveguide 200 does not lose the radio wave when transmitting the radio wave through the transmission space 230. Therefore, the surfaces where the first coupling surface 211 and the second coupling surface 221 are coupled in the longitudinal direction of the transmission space 230 are formed in the bending structure so that both the left and right coupling surfaces of the transmission space 230 are closely coupled.

Two or more surfaces where the projection 223 and the groove 213 are engaged with each other are formed, so that the bending structure formed by the first coupling surface 211 and the second coupling surface 221 may have twice or more bends. For example, the surfaces where the first coupling surface 211 and the second coupling surface 221 are engaged with each other may have the structure having twice or more bends on the left and right sides of the transmission space 230.

The projection 223 and the groove 213 may be formed as a projection having a semi-circular cross section and a semicircular groove corresponding to the projection having the semi-circular cross section, or formed as a projection having a rectangular cross section and a rectangular groove corresponding to the projection having the rectangular cross section.

Although not shown, one or more transmission spaces 230 may be formed. When one or more transmission spaces are formed, it is preferable that the coupling surfaces on the left of the leftmost transmission space and on the right of the rightmost transmission space are each formed in the bending structure. In this case, the bending structure may include one or more structures in which the projections and the grooves are engaged with each other.

As shown in FIGS. 10 to 12, the first body 210 and the second body 220 have the first coupling surface 211 and the second coupling surface 221 bonded by a coupling body 240.

The coupling body 240 is made of a bonding material for epoxy-bonding the first coupling surface 211 and the second coupling surface 221 when the first body 210 and the second body 220 are coupled. The coupling body 240 may be disposed on at least one of the first coupling surface 211 and the second coupling surface 221 in the form of a film to bond the first coupling surface 211 and the second coupling surface 221.

Alternatively, the coupling body 240 may be disposed in the coupling groove 215 of the first body 210 or the second body 220 to epoxy-bond the first coupling surface 211 and the second coupling surface 221 when the first body 210 and the second body 220 are coupled. To this end, the first body 210 and the second body 220 may include a plurality of coupling grooves 215 formed to be recessed in at least one of the first coupling surface 211 and the second coupling surface 221.

A plurality of coupling grooves 215 may be formed in at least one of the first body 210 and the second body 220 at certain intervals. According to the second exemplary embodiment, the coupling groove 215 is formed to be open to the first coupling surface 211 of the first body 210. The coupling body 240 is fitted into and coupled to the coupling groove 215 and a part thereof protrudes to the first coupling surface 211.

The coupling body 240 fitted into and coupled to the coupling groove 215 is melted to bond the first body 210 and the second body 220 when the second body 220 is coupled to the first body 210. The coupling body 240 is made of a bonding material such as epoxy. The coupling body 240 has a portion protruding to the first coupling surface 211 having a relatively wider area than that of a portion fitted into and coupled to the coupling groove 215. This is to increase the bonding force between the first coupling surface 211 and the second coupling surface 221 by increasing the area of the bonding material bonding the first coupling surface 211 and the second coupling surface 221.

The waveguide 200 may include a guide pin 250 configured to guide a coupling position when the first body 210 and the second body 220 are coupled. The guide pin 250 is used for vertical or horizontal alignment when the first body 210 and the second body 220 are coupled.

The guide pin 250 is inserted into a first pinhole 217 formed in the first body 210 and a second pinhole 227 formed in the second body 220. According to the second exemplary embodiment, one or more first pinholes 217 into which the guide pins 250 are inserted are formed in the first body 210, and the second pinhole 227 corresponding to the first pinhole 217 is formed in the second body 220 to communicate with the first pinhole 217.

According to the second exemplary embodiment, a plurality of first pinholes 217 are provided between the coupling grooves 240 at certain intervals. The guide pins 250 inserted into the first pinholes 217 may be inserted into the second pinholes 227 of the second body 220 when the second body 220 is coupled to the first body 210, thereby stably guiding the coupling position of the second body 220 with respect to the first body 210. An outer diameter of the guide pin 250 corresponds to outer diameters of the first pinhole 217 and the second pinhole 227.

As shown in FIG. 12, the first body 210 and the second body 220 are bonded by the coupling body 240. The coupling body 240 is melted to bond the first body 210 and the second body 220 when the second body 220 is coupled to the first body 220 in a state of being fitted into and coupled to the coupling groove 215 of the first body 210 formed at the position separated to both sides of the transmission space 230. To this end, the coupling body 240 may be fitted into and coupled to the coupling groove 215 of the first body 210 and melted, and then may couple the second body 220 to the first body 210.

It is preferable that the coupling body 240 is made of a bonding material having a melting temperature relatively lower than the melting temperatures of the first body 210 and the second body 220. This is to prevent the temperature applied while coupling the first body 210 and the second body 220 from melting or deforming the first body 210 and the second body 220. The coupling body 240 is made of a non-plated polymer material, and may preferably be made of a bonding material such as epoxy.

As shown in FIG. 13, the coupling position of the first body 210 and the second body 220 is aligned by the guide pin 250. The guide pin 250 is inserted into the second pinhole 227 of the second body 220 when the second body 220 is coupled to the first body 210 in the state of being inserted into the first pinhole 217 formed at the position separated to both sides of the transmission space 230 so that the first body 210 and the second body 220 are coupled at the correct position.

In the state where the first body 210 and the second body 220 are coupled, the first coupling surface 211 and the second coupling surface 221 may be closely coupled because they are engaged with each other by the structure of the groove 213 and the projection 223 to form the bending structure, and the coupling body 240 stably bonds the first body 210 and the second body 220, so that the gap does not occur between the first coupling surface 211 and the second coupling surface 221.

Referring to FIG. 9, the first body 210 and the second body 220 are closely coupled, and the coupling structure of the locking hook 261 and the locking step 263 are added to the first body 210 and the second body 220 so that the state of being closely coupled is maintained.

According to the second exemplary embodiment, the locking step 263 is provided on an outer surface of the first body 210 and the locking hook 261 is provided on an outer surface of the second body 220, so that the first body 210 and the second body 220 are formed in a structure in which the locking hook 261 is locked to the locking step 263 when the first body 210 and the second body 220 are coupled. A pair of coupling structures of the locking hook 261 and the locking step 263 are provided symmetrically on each of outer surfaces of both sides of the first body 210 and the second body 220 in the width direction.

As the locking hook 261 formed on the second body 220 is locked to the locking step 263 formed on the first body 210 when the first body 210 and the second body 220 are coupled, the first body 210 and the second body 220 are closely coupled, and the molten coupling body 240 in the process further closely bonds the first body 210 and the second body 220. The coupling body 242 may be melted by coupling the first body 210 and the second body 220 in a high-temperature environment. Alternatively, the first body 210 and the second body 220 may be bonded by melting the coupling body 240 when the first body 210 is coupled to the second body 220.

Meanwhile, the waveguide 200 to which the first body 210 and the second body 220 are coupled has a shape in which the waveguide part 200*a* and the coupling flange parts 200*b*, 200*c* formed on both ends of the waveguide part 200*a* are formed, and the transmission space 230 is formed to penetrate the waveguide part 200*a* and the coupling flange parts 200*b*, 200*c* formed on both ends of the waveguide part 200*a*.

According to the second exemplary embodiment, the waveguide part 200*a* is formed in a rectangular cross-sectional shape, and the coupling flange parts 200*b*, 200*c* formed on both ends of the waveguide part 200*a* are formed in a relatively greater rectangular cross-sectional shape than the cross section of the waveguide part 200*a*. The coupling flange parts 200*b*, 200*c* formed on both ends of the waveguide part 200*a* are configured to connect the waveguide 200 to the measuring instrument 10.

The coupling flange parts 200*b*, 200*c* formed on both ends of the waveguide part 200*a* are fixed to the connection flange parts (reference numerals 21, 31 in FIG. 8) of the measuring instrument 10 by bolting to communicate the transmission space 230 with the transmission rods (reference numeral 23 in FIG. 14A and reference numeral 33 in FIG. 15A) of the connection flange parts 21, 31.

As shown in FIGS. 9 and 10, the coupling flange parts 200*b*, 200*c* formed on both ends of the waveguide part 200*a* are formed in a shape in which a connection surface 270 includes an embossed portion 271, an engraved portion 273, and an embossed rim portion 275.

Specifically, the coupling flange parts 200*b*, 200*c* formed on both ends of the waveguide part 200*a* include the embossed portion 271 formed by forming a periphery around which the transmission space 230 is exposed to the outside in an embossed shape, and include the engraved portion 273 formed by forming the rim of the embossed portion 271 in an engraved shape recessed relatively compared to the embossed portion 271.

In addition, the coupling flange parts 200*b*, 200*c* formed on both ends of the waveguide part 200*a* further includes the embossed rim portion 275 in which the rim of the engraved portion 273 is formed to be embossed at the same height as the embossed portion 271.

When the measuring instrument 10 and the coupling flange parts 200*b*, 200*c* formed on both ends of the waveguide part 200*a* are coupled in the planar-to-planar structure, eccentricity occurs in the portion where the measuring instrument 10 and the waveguide 200 are in contact with each other, thereby causing a void and therefore, the radio wave is lost. Since the surfaces may be curved or rough due to the characteristics of the injection-molded products, the closely coupling is difficult when the coupling is made in a straight-line structure in which the plane and the plane are in contact with each other.

Therefore, the connection surface 270 of in the coupling flange parts 200*b*, 200*c* formed on both ends of the waveguide part 200*a* bonded to the first and second connection flange parts 21, 31 of the measuring instrument 10 is formed in a structure in which the embossed portion 271, the engraved portion 273, and the embossed rim portion 275 are repeated so that the coupling flange parts 200*b*, 200*c* formed on both ends of the waveguide part 200*a* and the first and second connection flange parts 21, 31 of the measuring instrument 10 may be closely coupled. The embossed portion 271 and the engraved portion 273 are formed in a circular shape. The embossed rim portion 275 may have only the portion connected to the engraved portion 273 formed in a circular shape.

According to the second exemplary embodiment, the widths of the embossed portion 271 and the engraved portion 273 are similar but the ratio thereof is adjustable. For example, the width of the engraved portion 273 may also be relatively narrower than that of the embossed portion 271, and the areas of the embossed portion 271 and the embossed rim portion 275 may also be relatively wider than that of the engraved portion 273 so that many portions in surface contact with the measuring instrument 10 may also be formed when they are connected to the measuring instrument 10.

As shown in FIGS. 14A, 14B, 15A, and 15B, the first and second connection flange parts 21, 31 of the measuring instrument 10 have the contact surfaces with the same shape to be in surface contact with the coupling flange parts 200*b*, 200*c* formed on both sides of the waveguide 200. Specifically, the first and second connection flange parts 21, 31 are formed in a structure in which the embossed portions 25*a*, 35*a*, the engraved portions 25*b*, 35*b*, and the embossed rim portions 25*c*, 3*d*5*c* are repeated as in the coupling flange parts 200*b*, 200*c* formed on both sides of the waveguide 200.

The coupling flange parts 200*b*, 200*c* formed on both sides of the waveguide 200 are formed with a plurality of bolt holes 280 for bolting with the first and second connection flange parts 21, 31. The plurality of bolt holes 280 are formed in the engraved portions 273 of the coupling flange parts 200*b*, 200*c* formed on both sides of the waveguide 200 at set intervals. When the bolt hole 280 is formed in the engraved portion 273, the first and second connection flange parts 21, 31 and the coupling flange parts 200*b*, 200*c* formed on both sides of the waveguide 200 may be more closely tightened and fixed.

As shown in FIGS. 14A and 14B, the coupling flange part 200*b* formed on one side of the waveguide 200 is coupled to the first connection flange part 21 of the transmission tube 20. The first connection flange part 21 and the coupling flange part 200*b* formed on one side of the waveguide 200 are formed in the same shape.

The first connection flange part 21 of the transmission tube 20 has the embossed portion 25*a* formed around the transmission rod 23, the engraved portion 25*b* formed on the rim of the embossed portion 25*a*, and the embossed rim portion 25*c* formed on the rim of the engraved portion 25*b*. The bolt holes 27 are formed at certain intervals in the engraved portion 25*b*.

The coupling flange part 200*b* formed on one side of the waveguide 200 has the embossed portion 271 formed around the transmission space 230, the engraved portion 273 formed on the rim of the embossed portion 271, and the embossed rim portion 275 formed on the rim of the engraved portion 273. The bolt hole 280 corresponding to the bolt hole 27 of the transmission tube 20 is formed in the engraved portion 273.

The embossed portion 25*a*, the engraved portion 25*b*, and the embossed rim portion 25*c* of the first connection flange part 21 are formed in the same shapes as those of the embossed portion 271, the engraved portion 273, and the embossed rim portion 275 of the coupling flange part 200*b*.

When the coupling flange part 200*b* formed on one side of the waveguide 200 is connected to the first connection flange part 21 of the transmission tube 20, the embossed portion 25*a* of the first connection flange part 21 and the embossed portion 271 of the coupling flange part 200*b* formed on one side of the waveguide 200 are closely coupled, and the embossed rim portion 25*c* of the first connection flange part 21 and the embossed rim portion 275 of the coupling flange part 200*b* formed on one side of the waveguide 200 are closely coupled.

In this state, when the fixing bolt is fastened to penetrate the bolt hole 27 formed in the engraved portion 25*b* of the first connection flange part 21 and the bolt hole 280 formed in the engraved portion 273 of the coupling flange part 200*b*, the fixing nut is fastened and tightened to the end of the fixing bolt having penetrated the two bolt holes 27, 280, so that the embossed portion 25*a* of the first connection flange part 21 and the embossed portion 271 of the coupling flange part 200*b* formed on one side of the waveguide 200 may be closely coupled, and the embossed rim portion 25*c* of the first connection flange part 21 and the embossed rim portion 275 of the coupling flange part 200*b* formed on one side of the waveguide 200 may be closely coupled.

When the engraved portion 25*b* of the first connection flange part 21 and the engraved portion 273 of the coupling flange part 200*b* are tightened by fastening the fixing bolt with the fixing nut, the fixing bolt and the fixing nut may compress and tighten the empty space between the two engraved portions 25*b*, 273, thereby increasing the force of tightening the fixing bolt to increase the adhesion of the portion in contact with each other.

The coupling flange part 200*b* formed on one side of the waveguide 200 has a through hole 285 formed in the engraved portion 273, and the first connection flange part 21 has a communication hole 28 formed in the engraved portion 25*b*. A guide pin 290 is coupled to the through hole 285 of the coupling flange part 200*b* and the communication hole 28 of the first connection flange part 21. The guide pin 290 aligns the coupling position of the coupling flange part 200*b* formed on one side of the waveguide 200 and the first connection flange part 21 so that all of the plurality of fixing bolts and fixing nuts fastened by penetrating the bolt hole 27 of the first connection flange part 21 and the bolt hole 280 of the coupling flange part 200*b* are tightened by the uniform force.

As shown in FIGS. 15A and 15B, the coupling flange part 200*c* formed on the other side of the waveguide 200 is coupled to the second connection flange part 31 of the reception tube 30. The second connection flange part 31 and the coupling flange part 200*c* formed on the other side of the waveguide 200 are formed in the same shape.

The embossed portion 35*a*, the engraved portion 35*b*, and the embossed rim portion 35*c* of the second connection flange part 31 of the reception tube 30 are formed in the same shapes as those of the embossed portion 271, the engraved portion 273, and the embossed rim portion 275 of the coupling flange part 200*c* formed on the other side of the waveguide 200.

When the coupling flange part 200*c* formed on the other side of the waveguide 200 is connected to the second connection flange part 31 of the reception tube 30, the embossed portion 35*a* of the second connection flange part

31 and the embossed portion 271 of the coupling flange part 200*c* formed on the other side of the waveguide 200 are closely coupled, and the embossed rim portion 35*c* of the second connection flange part 31 and the embossed rim portion 275 of the coupling flange part 200*c* formed on the other side of the waveguide 200 are closely coupled.

In this state, when the fixing bolt is fastened to penetrate the bolt hole 37 formed in the engraved portion 35*b* of the second connection flange part 31 and the bolt hole 280 formed in the engraved portion 273 of the coupling flange part 200*c*, the fixing nut is fastened and tightened to the end of the fixing bolt having penetrated the two bolt holes 37, 280, so that the embossed portion 35*a* of the second connection flange part 31 and the embossed portion 271 of the coupling flange part 200*c* formed on the other side of the waveguide 200 may be closely coupled, and the embossed rim portion 35*c* of the second connection flange part 31 and the embossed rim portion 275 of the coupling flange part 200*b* formed on the other side of the waveguide 200 may be closely coupled.

When the engraved portion 35*b* of the second connection flange part 31 and the engraved portion 273 of the coupling flange part 200*c* are tightened by fastening the fixing bolt with the fixing nut, the fixing bolt and the fixing nut may compress and tighten the empty space between the two engraved portions 35*b*, 273, thereby increasing the force of tightening the fixing bolt to increase the adhesion of the portion in contact with each other.

The coupling flange part 200*c* formed on the other side of the waveguide 200 has the through hole 285 formed in the engraved portion 273, and the second connection flange part 31 has a communication hole 38 formed in the engraved portion 35*b*. The guide pin 290 is coupled to the through hole 285 of the coupling flange part 200*c* and the communication hole 38 of the second connection flange part 31. The guide pin 290 aligns the coupling position of the coupling flange part 200*c* formed on the other side of the waveguide 200 and the second connection flange part 31 so that all of the plurality of fixing bolts and fixing nuts fastened by penetrating the bolt hole 37 of the second connection flange part 31 and the bolt hole 280 of the coupling flange part 200*c* formed on the other side of the waveguide 200 are tightened by the uniform force.

Therefore, the waveguide 200 may be closely coupled to the transmission tube 20 and the reception tube 30 of the measuring instrument 10 for checking the performance of the waveguide 200. When the waveguide 200 is closely coupled to the measuring instrument 10, it is possible to accurately test whether the waveguide 200 manufactured as the prototype leaks the radio wave while transmitting the radio wave.

In addition, according to the present disclosure, the waveguide may be manufactured by metal-coating and then bonding the first body 210 and the second body 220 injection-molded with the polymer material, so that it is possible to manufacture the waveguide with excellent performance by forming the coupling surfaces where the two bodies 210, 220 are engaged with each other in the bending structure to improve the adhesion, thereby preventing the radio wave from being lost.

In addition, according to the present disclosure, the first body 210 and the second body 220 are bonded by the coupling body 240 that is the bonding material and the guide pin 250 is applied to align the coupling position of the two bodies 210, 220 so that it is possible to manufacture the waveguide with excellent performance by stably closely coupling the two bodies 210, 220 even without using the screw to prevent the occurrence of the gap.

In addition, according to the present disclosure, the first body 210 and the second body 220 may be coupled by the structure of the locking hook 261 and the locking step 263, so that the coupling surfaces of the first body 210 and the second body 220 may be closely coupled and bonded and the state where the two bodies are closely coupled is firmly maintained.

The waveguide according to the present disclosure is used for the radar antenna for the vehicle and applied to the antenna that transmits the high-frequency wave such as 5G. It is important to increase the performance of the antenna in order to provide the best 5G quality.

Therefore, according to the present disclosure, the waveguide may be manufactured by metal-coating and then bonding two or more components injection-molded with the polymer material, so that it is possible to increase the adhesion of the coupling surface of the components and implement the stable coupling to prevent the radio wave from being lost through the coupling surface, thereby increasing the performance of the antenna. Furthermore, the waveguide according to the present disclosure may be formed in the structure that is also closely connected to the test measuring instrument, thereby accurately testing whether the radio wave is leaked while the waveguide manufactured as the prototype transmits the radio wave before mass production. Therefore, it is possible to improve the reliability of the performance of the waveguide actually mass-produced.

The present disclosure have disclosed the optimal exemplary embodiments in the drawings and the specification. Here, although specific terms have been used, they are used only for the purpose of describing the present disclosure and are not used to limit the meaning or scope of the present disclosure described in the claims. Therefore, it will be understood by those skilled in the art that various modifications and equivalent other exemplary embodiments of the present disclosure are possible therefrom. Therefore, the true technical scope of the present disclosure should be defined by the technical spirit of the appended claims.

The invention claimed is:

1. A waveguide comprising:

a first body and a second body injected-molded and having metal-coated surfaces and coupled in the up-down or left-right direction to form a transmission space in which a radio wave is movable in a longitudinal direction; and a first coupling surface and a second coupling surface being in surface contact with each other when the first body and the second body are coupled, wherein the first coupling surface and the second coupling surface are formed with a projection and a groove over the entire length adjacent to the transmission space, respectively, and the coupling surfaces where the projection and the groove of the first coupling surface and the groove and the projection of the second coupling surface are engaged with each other have a bending structure, wherein portions, which are exposed to the transmission space among the coupling surfaces where the projection and the groove of the first coupling surface and the groove and the projection of the second coupling surface are engaged with each other, are positioned at positions shifted from each other at upper and lower sides or left and right sides of the transmission space.

2. The waveguide of claim 1, wherein the surfaces where the grooves and the projections are engaged with each other are formed symmetrically at upper and lower sides or left and right sides of the transmission space.

3. The waveguide of claim 1, wherein one or more transmission spaces are formed, and each of coupling surfaces on an upper side of an uppermost transmission space and a lower side of a lowermost transmission space among the transmission spaces forms a bending structure.

4. The waveguide of claim 1, further comprising: a coupling body bonding the first coupling surface and the second coupling surface, wherein the coupling body is a bonding material that epoxy-bonds the first coupling surface and the second coupling surface when the first body and the second body are coupled.

5. The waveguide of claim 1, further comprising: a plurality of coupling grooves formed to be recessed in at least one of the first coupling surface and the second coupling surface; and a coupling body that is a bonding material disposed in the coupling groove to epoxy-bond the first coupling surface and the second coupling surface when the first body and the second body are coupled.

6. The waveguide of claim 1, further comprising: one or more first pinholes formed in the first body;

a second pinhole formed in the second body to be communicable with the first pinhole; and a guide pin inserted into the first pinhole to protrude therefrom and inserted into the second pinhole when the first body and the second body are coupled to guide a coupling position of the second body with respect to the first body.

7. The waveguide of claim 1, wherein an outer surface of the first body and an outer surface of the second body are provided with a locking step and a locking hook, and the locking hook is locked to the locking step when the first body and the second body are coupled.

8. The waveguide of claim 1, wherein the first body and the second body are coupled to form a waveguide part and coupling flange parts, which are connected to a measuring instrument, formed on both ends of the waveguide part, and wherein the transmission space is formed to penetrate the waveguide part and the coupling flange parts.

9. The waveguide of claim 8, wherein the coupling flange part is fixed to a connection flange part of the measuring instrument by bolting to communicate the transmission space with a transmission rod of the connection flange part, and wherein the coupling flange part and the connection flange part have contact surfaces with the same shape to be in surface contact with each other.

10. The waveguide of claim 8, wherein the coupling flange part comprises:

an embossed portion formed by forming a periphery around which the transmission space is exposed to the outside in an embossed shape; and an engraved portion formed by forming the rim of the embossed portion in an engraved shape recessed relatively compared to the embossed portion.

11. The waveguide of claim 10, wherein the coupling flange part further comprises: an embossed rim portion formed by forming the rim of the engraved portion in an embossed shape at the same height as that of the embossed portion.

12. The waveguide of claim 8, wherein the coupling flange part further comprises:

an embossed portion formed by forming a periphery around which the transmission space is exposed to the outside in an embossed shape; and an engraved portion formed by forming the rim of the embossed portion in an engraved shape recessed relatively compared to the embossed portion, and wherein a plurality of bolt holes for bolting with the connection flange part of the measuring instrument are formed at certain intervals, and the bolt hole is formed in the engraved portion.

13. The waveguide of claim 8, further comprising: a plurality of first assembling holes and second assembling holes formed to correspond to the first body and the second body in order to closely assemble the waveguide part; and bolts penetrating the first assembling holes and the second assembling holes, some of which are fastened in a direction from the first body to the second body and the others of which are fastened in a direction from the second body to the first body.

* * * * *